(12) United States Patent
Chai et al.

(10) Patent No.: US 10,263,742 B2
(45) Date of Patent: Apr. 16, 2019

(54) COORDINATED COMMUNICATION METHOD AND SYSTEM AND APPARATUS

(71) Applicant: HUAWEI TECHNOLOGIES CO., LTD., Shenzhen (CN)

(72) Inventors: Li Chai, Beijing (CN); Bo Lin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 175 days.

(21) Appl. No.: 15/222,274

(22) Filed: Jul. 28, 2016

(65) Prior Publication Data
US 2016/0337099 A1 Nov. 17, 2016

Related U.S. Application Data

(63) Continuation of application No. PCT/CN2014/071761, filed on Jan. 29, 2014.

(51) Int. Cl.
*H04L 5/00* (2006.01)
*H04B 7/024* (2017.01)
(Continued)

(52) U.S. Cl.
CPC .......... *H04L 5/0035* (2013.01); *H04B 7/024* (2013.01); *H04W 72/0433* (2013.01);
(Continued)

(58) Field of Classification Search
None
See application file for complete search history.

(56) References Cited

U.S. PATENT DOCUMENTS

2010/0067604 A1  3/2010 Bhadra et al.
2011/0268007 A1* 11/2011 Barany .............. H04B 7/024
                                              370/312
(Continued)

FOREIGN PATENT DOCUMENTS

CN     102149130 A    8/2011
CN     102685797 A    9/2012
(Continued)

OTHER PUBLICATIONS

International Search Report dated Nov. 6, 2014 in corresponding International Application No. PCT/CN2014/071761.
(Continued)

*Primary Examiner* — Lonnie V Sweet
(74) *Attorney, Agent, or Firm* — Staas & Halsey LLP

(57) ABSTRACT

Embodiments of the present disclosure provide a coordinated communication method which can reduce a transmission delay in inter-base-station coordinated communication when reliability of the inter-base-station coordinated communication is ensured. The method may include: sending first instruction information and second instruction information to each of n first base stations, so that each of the n first base stations establishes a first interface and a second interface according to the first instruction information and the second instruction information; receiving, by using the second interface, measurement information reported by each of the n first base stations, where the measurement information is a measurement results of m cells; determining resource configuration information of the m cells according to the measurement information; and sending the resource configuration information of the m cells to each of the n first base stations by using the first interface.

17 Claims, 15 Drawing Sheets

(51) Int. Cl.
 *H04W 72/04* (2009.01)
 *H04W 76/15* (2018.01)
 *H04W 76/12* (2018.01)
 *H04W 88/12* (2009.01)

(52) U.S. Cl.
 CPC .......... *H04W 76/12* (2018.02); *H04W 76/15* (2018.02); *H04W 88/12* (2013.01)

(56) References Cited

U.S. PATENT DOCUMENTS

| | | | |
|---|---|---|---|
| 2012/0202431 A1* | 8/2012 | Hawryluck | H04B 7/024 455/63.4 |
| 2013/0088979 A1* | 4/2013 | Bi | H04B 7/024 370/252 |
| 2013/0165122 A1* | 6/2013 | Tanaka | H04B 7/024 455/436 |
| 2013/0273931 A1 | 10/2013 | Lunttila et al. | |
| 2014/0056272 A1 | 2/2014 | Gao et al. | |
| 2015/0036658 A1* | 2/2015 | Mochizuki | H04W 24/10 370/331 |
| 2015/0296390 A1* | 10/2015 | Mino Diaz | H04L 5/003 455/450 |

FOREIGN PATENT DOCUMENTS

| | | |
|---|---|---|
| CN | 103262601 A | 8/2013 |
| EP | 2 582 084 A2 | 4/2013 |

OTHER PUBLICATIONS

International Search Report dated Nov. 6, 2014 in corresponding International Patent Application No. PCT/CN2014/071761.
Extended European Search Report dated Dec. 9, 2016 in corresponding European Patent Application No. 14880473.5.
"Analysis of the capacity and latency constraints in CoMP", 3GPP TSG RAN WG1 Meeting #63BIS, R1-110107, Jan. 17-21, 2011, Dublin, Ireland, pp. 1-6.
"Considerations on coordination signaling for inter-eNB CoMP", 3GPP TSG RAN WG1 Meeting #75, R1-135096, Nov. 11-15, 2013, San Francisco, USA, pp. 1-4.
"3rd Generation Partnership Project; Technical Specification Group Radio Access Network; Evolved Universal Terrestrial Radio Access Network (E-UTRAN); X2 application protocol (X2AP)(Release 12)", 3GPP TS 36.423 V12.0.0, 3GPP Organizational Partners, Dec. 2013, Valbonne, France, pp. 1-144.

* cited by examiner

COORDINATED COMMUNICATION METHOD AND SYSTEM AND APPARATUS

CROSS REFERENCE

This application is a continuation of International Application No. PCT/CN2014/071761, filed on Jan. 29, 2014, which is hereby incorporated by reference in its entirety.

TECHNICAL FIELD

The present disclosure relates to the communications field, and in particular, to a coordinated communication method and system, and an apparatus.

BACKGROUND

CoMP (coordinated multipoint transmission/reception) is one of important technologies in an LTE-A (Long Term Evolution-Advanced) system. The CoMP means that multiple geographically separate transmission points participate in data transmission for a UE (user equipment) in a coordinated manner, or receive, in a coordinated manner, data sent by a UE, that is, coordinated communication in different cells of a base station is performed on the UE. On the basis of the CoMP, a technology in which coordinated communication in cells of different base stations is performed on UE, that is, eCoMP is provided.

In an existing eCoMP technology, after acquiring measurement information reported by UE, a base station may send the measurement information of the UE to another base station in the eCoMP by using an inter-base-station coordination interface. After allocating, according to the measurement information of the UE, resource information to a cell in which the UE is located, the another base station sends the allocated resource information to the base station by using the inter-base-station coordination interface, so as to implement resource coordination and configuration between base stations. Therefore, different base stations can perform coordinated communication on UE. There are two types of inter-base-station coordination interfaces: one type is a control plane interface, and an underlying bearer of the control plane interface is SCTP (Stream Control Transmission Protocol); the other type is a user plane interface, and an underlying bearer of the user plane interface is UDP (User Datagram Protocol).

However, on one hand, if base stations use a control plane interface to transmit measurement information of UE and resource information allocated to a cell, reliable transmission implemented by using SCTP causes a relatively long delay in transmitting the measurement information and the resource information, thereby affecting performance of inter-base-station coordinated communication. On the other hand, if base stations use a user plane interface to transmit measurement information of UE and resource information allocated to a cell, unreliable transmission implemented by using UDP causes a loss of a part of the measurement information and a part of the resource information, thereby reducing performance of inter-base-station coordinated communication.

SUMMARY

Embodiments of the present disclosure provide a coordinated communication method and system, and an apparatus, which can reduce a transmission delay in inter-base-station coordinated communication when reliability of the inter-base-station coordinated communication is ensured, and improve performance of the inter-base-station coordinated communication.

To achieve the foregoing objective, the following technical solutions are adopted in the embodiments of the present disclosure.

According to a first aspect, an embodiment of the present disclosure provides a control node, including:

a sending unit, configured to send first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1;

a receiving unit, configured to receive, by using the second interface, measurement information reported by each of the n first base stations, where the measurement information is measurement results of m cells, and the m cells are served by any base station in the n first base stations, and m≥1; and a determining unit, configured to determine resource configuration information of the m cells according to the measurement information received by the receiving unit; where the sending unit is further configured to send, to each of the n first base stations by using the first interface, the resource configuration information of the m cells that is determined by the determining unit, so that each of the n first base stations performs configuration according to the resource configuration information of the m cells.

In a first possible implementation manner of the first aspect, the second instruction information sent by the sending unit includes identifiers of the m cells and a first tunnel identifier and a first tunnel type identifier that are corresponding to the identifiers of the m cells.

With reference to the first possible implementation manner of the first aspect, in a second possible implementation manner, the second instruction information sent by the sending unit further includes an identifier of UE and a second tunnel identifier and at least one second tunnel type identifier that are corresponding to the identifier of the UE.

With reference to the second possible implementation manner of the first aspect, in a third possible implementation manner, the second instruction information sent by the sending unit further includes at least one bearer identifier corresponding to the UE, and each bearer identifier is corresponding to the at least one second tunnel type identifier.

With reference to any implementation manner in the first possible implementation manner to the third possible implementation manner of the first aspect, in a fourth possible implementation manner, the second interface includes m first tunnels corresponding to the first tunnel type identifier sent by the sending unit; and the receiving unit is specifically configured to receive, by using each first tunnel in the m first tunnels, the measurement information reported by each of the n first base stations.

With reference to the fourth possible implementation manner of the first aspect, in a fifth possible implementation manner, a frame format of a data packet transmitted in each first tunnel includes a frame header part and a data part; and the receiving unit is further specifically configured to receive, by using each first tunnel, the data packet reported by each of the n first base stations, where the data part in the data packet carries the measurement information.

With reference to the fourth possible implementation manner or the fifth possible implementation manner of the first aspect, in a sixth possible implementation manner, the second interface further includes at least one second tunnel in a one-to-one correspondence with the at least one second tunnel type identifier sent by the sending unit; and the sending unit is further configured to: after sending the second instruction information to the n first base stations, send a protocol data unit PDU data packet to the n first base stations by using each second tunnel in the at least one second tunnel, so that each of the n first base stations sends the PDU data packet to the UE, where the PDU data packet is corresponding to any tunnel type identifier in the at least one second tunnel type identifier.

With reference to the sixth possible implementation manner of the first aspect, in a seventh possible implementation manner, the sending unit is specifically configured to send, to the n first base stations by using each second tunnel in the at least one second tunnel, the PDU data packet and a bearer identifier corresponding to the PDU data packet.

With reference to the foregoing first aspect or any implementation manner in the first possible implementation manner to the seventh possible implementation manner of the first aspect, in an eighth possible implementation manner, the sending unit is further configured to: before the receiving unit receives, by using the second interface, the measurement information reported by each of the n first base stations, send an enabling message to the n first base stations, where the enabling message is used to enable the n first base stations to report the measurement information by using the second interface.

With reference to any implementation manner in the second possible implementation manner to the eighth possible implementation manner of the first aspect, in a ninth possible implementation manner, the second tunnel type identifier sent by the sending unit includes a Packet Data Convergence Protocol PDCP protocol data unit PDU, a Radio Link Control RLC PDU, and a Media Access Control MAC PDU.

With reference to the foregoing first aspect or any implementation manner in the first possible implementation manner to the ninth possible implementation manner of the first aspect, in a tenth possible implementation manner, the first instruction information sent by the sending unit is carried in a first request message, and the first request message further carries at least one of measurement parameter information, measurement feedback time information, UE quantity feedback information, or the identifiers of the m cells; and the sending unit is further configured to: after sending the first instruction information to the n first base stations, send the at least one of the measurement parameter information, the measurement feedback time information, the UE quantity feedback information, or the identifiers of the m cells to each of the n first base stations, so that each of the n first base stations performs configuration on the first interface according to the at least one of the measurement parameter information, the measurement feedback time information, the UE quantity feedback information, or the identifiers of the m cells.

With reference to the foregoing first aspect or any implementation manner in the first possible implementation manner to the tenth possible implementation manner of the first aspect, in an eleventh possible implementation manner, the resource configuration information determined by the determining unit includes at least one of time domain information of a resource, frequency domain information of the resource, space domain information of the resource, code domain information of the resource, transmit power information of the resource, or information about a time at which resource configuration may be performed.

With reference to the foregoing first aspect or any implementation manner in the first possible implementation manner to the eleventh possible implementation manner of the first aspect, in a twelfth possible implementation manner, the control node further includes an acquiring unit;

the acquiring unit is configured to acquire information about the n first base stations before the sending unit sends the first instruction information and the second instruction information to each of the n first base stations; and the determining unit is further configured to determine the n first base stations according to the information about the n first base stations acquired by the acquiring unit.

With reference to the foregoing first aspect or any implementation manner in the first possible implementation manner to the twelfth possible implementation manner of the first aspect, in a thirteenth possible implementation manner, the control node further includes a stop unit;

the sending unit is further configured to: after sending the resource configuration information of the m cells to each of the n first base stations by using the first interface, send at least one cell identifier in the identifiers of the m cells and stop instruction information to the n first base stations, so that each of the n first base stations stops, according to the at least one cell identifier and the stop instruction information, reporting measurement information of at least one cell corresponding to the at least one cell identifier, where the stop instruction information is used to instruct the n first base stations to stop reporting measurement information of a cell;

the receiving unit is further configured to receive a first reply confirmation message sent by each of the n first base stations; and the stop unit is configured to stop, according to the first reply confirmation message received by the receiving unit, receiving the measurement information of the at least one cell.

With reference to the foregoing first aspect or any implementation manner in the first possible implementation manner to the twelfth possible implementation manner of the first aspect, in a fourth possible implementation manner, the control node further includes a stop unit;

the sending unit is further configured to: after sending the resource configuration information of the m cells to each of the n first base stations by using the first interface, send at least one cell identifier in the identifiers of the m cells and release instruction information to the n first base stations, so that each of the n first base stations stops, according to the at least one cell identifier and the release instruction information, measuring at least one cell corresponding to the at least one cell identifier and reporting measurement information of the at least one cell, where the release instruction information is used to instruct the n first base stations to stop measuring a cell and reporting measurement information of the cell;

the receiving unit is further configured to receive a second reply confirmation message sent by the n first base stations; and the stop unit is configured to stop, according to the second reply confirmation message received by the receiving unit, receiving the measurement information of the at least one cell.

With reference to the foregoing first aspect or any implementation manner in the first possible implementation manner to the fourteenth possible implementation manner of the first aspect, in a fifteenth possible implementation manner, an underlying bearer of the first interface is Stream Control Transmission Protocol SCTP, and an underlying bearer of the second interface is User Datagram Protocol UDP.

According to a second aspect, an embodiment of the present disclosure provides a first base station, including:

a receiving unit, configured to receive first instruction information and second instruction information that are sent by a control node, where the first instruction information is used to instruct to establish a first interface, and the second instruction information is used to instruct to establish a second interface;

an establishment unit, configured to: establish the first interface according to the first instruction information received by the receiving unit, and establish the second interface according to the second instruction information received by the receiving unit;

a sending unit, configured to send measurement information to the control node by using the second interface established by the establishment unit, so that the control node determines resource configuration information of m cells according to the measurement information, where the measurement information is measurement results of the m cells, and the m cells are cells in a coordinated communication set, and m≥1; where the receiving unit is further configured to receive, by using the first interface established by the establishment unit, the resource configuration information of the m cells that is sent by the control node; and a coordination unit, configured to perform configuration according to the resource configuration information of the m cells that is received by the receiving unit.

In a first possible implementation manner of the second aspect, the second instruction information received by the receiving unit includes identifiers of the m cells and a first tunnel identifier and a first tunnel type identifier that are corresponding to the identifiers of the m cells; and the establishment unit is specifically configured to establish m first tunnels according to the identifiers of the m cells, the first tunnel identifier, and the first tunnel type identifier that are received by the receiving unit.

With reference to the first possible implementation manner of the second aspect, in a second possible implementation manner, the second instruction information received by the receiving unit further includes an identifier of UE and a second tunnel identifier and at least one second tunnel type identifier that are corresponding to the identifier of the UE; and the establishment unit is further specifically configured to establish at least one second tunnel according to the identifier of the UE, the second tunnel identifier, and the at least one second tunnel type identifier that are received by the receiving unit.

With reference to the second possible implementation manner of the second aspect, in a third possible implementation manner, the second instruction information received by the receiving unit further includes at least one bearer identifier corresponding to the UE, and each bearer identifier is corresponding to the at least one second tunnel type identifier; and the establishment unit is further specifically configured to establish the at least one second tunnel according to the identifier of the UE, the second tunnel identifier, the at least one second tunnel type identifier, and the at least one bearer identifier that are received by the receiving unit.

With reference to any implementation manner in the first possible implementation manner to the third possible implementation manner of the second aspect, in a fourth possible implementation manner, the second interface established by the establishment unit includes the m first tunnels corresponding to the first tunnel type identifier received by the receiving unit; and the sending unit is specifically configured to send the measurement information to the control node by using each first tunnel in the m first tunnels established by the establishment unit.

With reference to the fourth possible implementation manner of the second aspect, in a fifth possible implementation manner, a frame format of a data packet transmitted in each first tunnel established by the establishment unit includes a frame header part and a data part; and the sending unit is further specifically configured to send the data packet to the control node by using each first tunnel established by the establishment unit, where the data part in the data packet carries the measurement information.

With reference to the fourth possible implementation manner or the fifth possible implementation manner of the second aspect, in a sixth possible implementation manner, the second interface established by the establishment unit further includes the at least one second tunnel in a one-to-one correspondence with the at least one second tunnel type identifier received by the receiving unit;

the receiving unit is further configured to: after the establishment unit establishes the second interface according to the second instruction information, receive, by using each second tunnel in the at least one second tunnel established by the establishment unit, a protocol data unit PDU data packet sent by the control node; and the sending unit is further configured to send the PDU data packet received by the receiving unit to the UE, where the PDU data packet is corresponding to any tunnel type identifier in the at least one second tunnel type identifier.

With reference to the sixth possible implementation manner of the second aspect, in a seventh possible implementation manner, the receiving unit is specifically configured to receive, by using each second tunnel in the at least one second tunnel, the PDU data packet and at least one bearer identifier corresponding to the PDU data packet that are sent by the control node; and the sending unit is further specifically configured to send the PDU data packet and the at least one bearer identifier that are received by the receiving unit to a first entity of the UE, where the first entity is a protocol layer entity corresponding to the PDU data packet.

With reference to the foregoing second aspect or any implementation manner in the first possible implementation manner to the seventh possible implementation manner of the second aspect, in an eighth possible implementation manner, the receiving unit is further configured to: before the sending unit sends the measurement information to the control node by using the second interface established by the establishment unit, receive an enabling message sent by the control node, where the enabling message is used to enable the measurement information to be reported by using the second interface.

With reference to any implementation manner in the second possible implementation manner to the eighth possible implementation manner of the second aspect, in a ninth possible implementation manner, the second tunnel type identifier received by the receiving unit includes a Packet Data Convergence Protocol PDCP protocol data unit PDU, a Radio Link Control RLC PDU, and a Media Access Control MAC PDU.

With reference to the foregoing second aspect or any implementation manner in the first possible implementation manner to the ninth possible implementation manner of the second aspect, in a tenth possible implementation manner, the first instruction information received by the receiving unit is carried in a first request message, the first request message further carries at least one of measurement parameter information, measurement feedback time information, UE quantity feedback information, or the identifiers of the m cells, and the first base station further includes a configuration unit;

the receiving unit is further configured to: after the establishment unit establishes the first interface according to the first instruction information, receive the at least one, which is sent by the control node, of the measurement parameter information, the measurement feedback time information, the UE quantity feedback information, and the identifies of the m cells; and the configuration unit is configured to perform, according to the at least one, which is received by the receiving unit, of the measurement parameter information, the measurement feedback time information, the UE quantity feedback information, or the identifiers of the m cells, configuration on the first interface established by the establishment unit.

With reference to the foregoing second aspect or any implementation manner in the first possible implementation manner to the tenth possible implementation manner of the second aspect, in an eleventh possible implementation manner, the resource configuration information received by the receiving unit includes at least one of time domain information of a resource, frequency domain information of the resource, space domain information of the resource, code domain information of the resource, transmit power information of the resource, or information about a time at which resource configuration may be performed; and the coordination unit is specifically configured to perform configuration according to the at least one, which is received by the receiving unit, of the time domain information of the resource in the m cells, the frequency domain information of the resource in the m cells, the space domain information of the resource in the m cells, the code domain information of the resource in the m cells, the transmit power information of the resource in the m cells, and the information about the time at which resource configuration may be performed in the m cells.

With reference to the foregoing second aspect or any implementation manner in the first possible implementation manner to the eleventh possible implementation manner of the second aspect, in a twelfth possible implementation manner, the first base station further includes a stop unit;

the receiving unit is further configured to: after configuration is performed according to the resource configuration information of the m cells, receive at least one cell identifier in the identifiers of the m cells and stop instruction information that are sent by the control node, where the stop instruction information is used to instruct to stop reporting measurement information of a cell;

the stop unit is configured to stop, according to the at least one cell identifier and the stop instruction information that are received by the receiving unit, reporting measurement information of at least one cell corresponding to the at least one cell identifier; and the sending unit is further configured to send a first reply confirmation message to the control node, so that the control node stops, according to the first reply confirmation message, receiving the measurement information of the at least one cell.

With reference to the foregoing second aspect or any implementation manner in the first possible implementation manner to the eleventh possible implementation manner of the second aspect, in a thirteenth possible implementation manner, the first base station further includes a stop unit;

the receiving unit is further configured to: after configuration is performed according to the resource configuration information of the m cells, receive at least one cell identifier in the identifiers of the m cells and release instruction information that are sent by the control node, where the release instruction information is used to instruct to stop measuring a cell and reporting measurement information of the cell;

the stop unit is configured to stop, according to the at least one cell identifier and the release instruction information that are received by the receiving unit, measuring at least one cell corresponding to the at least one cell identifier and reporting measurement information of the at least one cell; and the sending unit is further configured to send a second reply confirmation message to the control node, so that the control node stops, according to the second reply confirmation message, receiving the measurement information of the at least one cell.

With reference to the foregoing second aspect or any implementation manner in the first possible implementation manner to the thirteenth possible implementation manner of the second aspect, in a fourteenth possible implementation manner, an underlying bearer of the first interface established by the establishment unit is Stream Control Transmission Protocol SCTP, and an underlying bearer of the second interface established by the establishment unit is User Datagram Protocol UDP.

According to a third aspect, an embodiment of the present disclosure further provides a control node, including:

a transmitter, configured to send first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1;

a receiver, configured to receive, by using the second interface, measurement information reported by each of the n first base stations, where the measurement information is measurement results of m cells, and the m cells are served by any base station in the n first base stations, and m≥1; and a processor, configured to determine resource configuration information of the m cells according to the measurement information received by the receiver; where the transmitter is further configured to send, to each of the n first base stations by using the first interface, the resource configuration information of the m cells that is determined by the processor, so that each of the n first base stations performs configuration according to the resource configuration information of the m cells.

In a first possible implementation manner of the third aspect, the second instruction information sent by the transmitter includes identifiers of the m cells and a first tunnel identifier and a first tunnel type identifier that are corresponding to the identifiers of the m cells.

With reference to the first possible implementation manner of the third aspect, in a second possible implementation manner, the second instruction information sent by the transmitter further includes an identifier of UE and a second tunnel identifier and at least one second tunnel type identifier that are corresponding to the identifier of the UE.

With reference to the second possible implementation manner of the third aspect, in a third possible implementation manner, the second instruction information sent by the transmitter further includes at least one bearer identifier corresponding to the UE, and each bearer identifier is corresponding to the at least one second tunnel type identifier.

With reference to any implementation manner in the first possible implementation manner to the third possible implementation manner of the third aspect, in a fourth possible implementation manner, the second interface includes m first tunnels corresponding to the first tunnel type identifier sent by the transmitter; and the receiver is specifically configured to receive, by using each first tunnel in the m first tunnels, the measurement information reported by each of the n first base stations.

With reference to the fourth possible implementation manner of the third aspect, in a fifth possible implementation manner, a frame format of a data packet transmitted in each first tunnel includes a frame header part and a data part; and the receiver is further specifically configured to receive, by using each first tunnel, the data packet reported by each of the n first base stations, where the data part in the data packet carries the measurement information.

With reference to the fourth possible implementation manner or the fifth possible implementation manner of the third aspect, in a sixth possible implementation manner, the second interface further includes at least one second tunnel in a one-to-one correspondence with the at least one second tunnel type identifier sent by the transmitter; and the transmitter is further configured to: after sending the second instruction information to the n first base stations, send a protocol data unit PDU data packet to the n first base stations by using each second tunnel in the at least one second tunnel, so that each of the n first base stations sends the PDU data packet to the UE, where the PDU data packet is corresponding to any tunnel type identifier in the at least one second tunnel type identifier.

With reference to the sixth possible implementation manner of the third aspect, in a seventh possible implementation manner, the transmitter is specifically configured to send, to the n first base stations by using each second tunnel in the at least one second tunnel, the PDU data packet and a bearer identifier corresponding to the PDU data packet.

With reference to the foregoing third aspect or any implementation manner in the first possible implementation manner to the seventh possible implementation manner of the third aspect, in an eighth possible implementation manner, the transmitter is further configured to: before the receiver receives, by using the second interface, the measurement information reported by each of the n first base stations, send an enabling message to the n first base stations, where the enabling message is used to enable the n first base stations to report the measurement information by using the second interface.

With reference to any implementation manner in the second possible implementation manner to the eighth possible implementation manner of the third aspect, in a ninth possible implementation manner, the second tunnel type identifier sent by the transmitter includes a Packet Data Convergence Protocol PDCP protocol data unit PDU, a Radio Link Control RLC PDU, and a Media Access Control MAC PDU.

With reference to the foregoing third aspect or any implementation manner in the first possible implementation manner to the ninth possible implementation manner of the third aspect, in a tenth possible implementation manner, the first instruction information sent by the transmitter is carried in a first request message, and the first request message further carries at least one of measurement parameter information, measurement feedback time information, UE quantity feedback information, or the identifiers of the m cells; and the transmitter is further configured to: after sending the first instruction information to the n first base stations, send the at least one of the measurement parameter information, the measurement feedback time information, the UE quantity feedback information, or the identifiers of the m cells to each of the n first base stations, so that each of the n first base stations performs configuration on the first interface according to the at least one of the measurement parameter information, the measurement feedback time information, the UE quantity feedback information, or the identifiers of the m cells.

With reference to the foregoing third aspect or any implementation manner in the first possible implementation manner to the tenth possible implementation manner of the third aspect, in an eleventh possible implementation manner, the resource configuration information determined by the processor includes at least one of time domain information of a resource, frequency domain information of the resource, space domain information of the resource, code domain information of the resource, transmit power information of the resource, or information about a time at which resource configuration may be performed.

With reference to the foregoing third aspect or any implementation manner in the first possible implementation manner to the eleventh possible implementation manner of the third aspect, in a twelfth possible implementation manner, the processor is further configured to: before the transmitter sends the first instruction information and the second instruction information to each of the n first base stations, acquire information about the n first base stations, and determine the n first base stations according to the acquired information about the n first base stations.

With reference to the foregoing third aspect or any implementation manner in the first possible implementation manner to the twelfth possible implementation manner of the third aspect, in a thirteenth possible implementation manner, the transmitter is further configured to: after sending the resource configuration information of the m cells to each of the n first base stations by using the first interface, send at least one cell identifier in the identifiers of the m cells and stop instruction information to the n first base stations, so that each of the n first base stations stops, according to the at least one cell identifier and the stop instruction information, reporting measurement information of at least one cell corresponding to the at least one cell identifier, where the stop instruction information is used to instruct the n first base stations to stop reporting measurement information of a cell;

the receiver is further configured to receive a first reply confirmation message sent by each of the n first base stations; and the processor is further configured to stop, according to the first reply confirmation message received by the receiver, receiving the measurement information of the at least one cell.

With reference to the foregoing third aspect or any implementation manner in the first possible implementation manner to the twelfth possible implementation manner of the third aspect, in a fourteenth possible implementation manner, the transmitter is further configured to: after sending the resource configuration information of the m cells to each of the n first base stations by using the first interface, send at least one cell identifier in the identifiers of the m cells and release instruction information to the n first base stations, so that each of the n first base stations stops, according to the at least one cell identifier and the release instruction information, measuring at least one cell corresponding to the at least one cell identifier and reporting measurement information of the at least one cell, where the release instruction information is used to instruct the n first base stations to stop measuring a cell and reporting measurement information of the cell;

the receiver is further configured to receive a second reply confirmation message sent by the n first base stations; and the processor is further configured to stop, according to the second reply confirmation message received by the receiver, receiving the measurement information of the at least one cell.

With reference to the foregoing third aspect or any implementation manner in the first possible implementation manner to the fourteenth possible implementation manner of the third aspect, in a fifteenth possible implementation manner, an underlying bearer of the first interface is Stream Control Transmission Protocol SCTP, and an underlying bearer of the second interface is User Datagram Protocol UDP.

According to a fourth aspect, an embodiment of the present disclosure further provides a first base station, including:

a receiver, configured to receive first instruction information and second instruction information that are sent by a control node, where the first instruction information is used to instruct to establish a first interface, and the second instruction information is used to instruct to establish a second interface;

a processor, configured to: establish the first interface according to the first instruction information received by the receiver, and establish the second interface according to the second instruction information received by the receiver; and a transmitter, configured to send measurement information to the control node by using the second interface established by the processor, so that the control node determines resource configuration information of m cells according to the measurement information, where the measurement information is measurement results of the m cells, and the m cells are cells in a coordinated communication set, and m≥1; where the receiver is further configured to receive, by using the first interface established by the processor, the resource configuration information of the m cells that is sent by the control node; and the processor is further configured to perform configuration according to the resource configuration information of the m cells that is received by the receiver.

In a first possible implementation manner of the fourth aspect, the second instruction information received by the receiver includes identifiers of the m cells and a first tunnel identifier and a first tunnel type identifier that are corresponding to the identifiers of the m cells; and the processor is specifically configured to establish m first tunnels according to the identifiers of the m cells, the first tunnel identifier, and the first tunnel type identifier that are received by the receiver.

With reference to the first possible implementation manner of the fourth aspect, in a second possible implementation manner, the second instruction information received by the receiver further includes an identifier of UE and a second tunnel identifier and at least one second tunnel type identifier that are corresponding to the identifier of the UE; and the processor is further specifically configured to establish at least one second tunnel according to the identifier of the UE, the second tunnel identifier, and the at least one second tunnel type identifier that are received by the receiver.

With reference to the second possible implementation manner of the fourth aspect, in a third possible implementation manner, the second instruction information received by the receiver further includes at least one bearer identifier corresponding to the UE, and each bearer identifier is corresponding to the at least one second tunnel type identifier; and the processor is further specifically configured to establish the at least one second tunnel according to the identifier of the UE, the second tunnel identifier, the at least one second tunnel type identifier, and the at least one bearer identifier that are received by the receiver.

With reference to any implementation manner in the first possible implementation manner to the third possible implementation manner of the fourth aspect, in a fourth possible implementation manner, the second interface established by the processor includes the m first tunnels corresponding to the first tunnel type identifier received by the receiver; and the transmitter is specifically configured to send the measurement information to the control node by using each first tunnel in the m first tunnels established by the processor.

With reference to the fourth possible implementation manner of the fourth aspect, in a fifth possible implementation manner, a frame format of a data packet transmitted in each first tunnel established by the processor includes a frame header part and a data part; and the transmitter is further specifically configured to send the data packet to the control node by using each first tunnel established by the processor, where the data part in the data packet carries the measurement information.

With reference to the fourth possible implementation manner or the fifth possible implementation manner of the fourth aspect, in a sixth possible implementation manner, the second interface established by the processor further includes the at least one second tunnel in a one-to-one correspondence with the at least one second tunnel type identifier received by the receiver;

the receiver is further configured to: after the processor establishes the second interface according to the second instruction information, receive, by using each second tunnel in the at least one second tunnel established by the processor, a protocol data unit PDU data packet sent by the control node; and the transmitter is further configured to send the PDU data packet received by the receiver to the UE, where the PDU data packet is corresponding to any tunnel type identifier in the at least one second tunnel type identifier.

With reference to the sixth possible implementation manner of the fourth aspect, in a seventh possible implementation manner, the receiver is specifically configured to receive, by using each second tunnel in the at least one second tunnel, the PDU data packet and at least one bearer identifier corresponding to the PDU data packet that are sent by the control node; and the transmitter is further specifically configured to send the PDU data packet and the at least one bearer identifier that are received by the receiver to a first entity of the UE, where the first entity is a protocol layer entity corresponding to the PDU data packet.

With reference to the foregoing fourth aspect or any implementation manner in the first possible implementation manner to the seventh possible implementation manner of the fourth aspect, in an eighth possible implementation manner, the receiver is further configured to: before the transmitter sends the measurement information to the control node by using the second interface established by the processor, receive an enabling message sent by the control node, where the enabling message is used to enable the measurement information to be reported by using the second interface.

With reference to any implementation manner in the second possible implementation manner to the eighth possible implementation manner of the fourth aspect, in a ninth possible implementation manner, the second tunnel type identifier received by the receiver includes a Packet Data Convergence Protocol PDCP protocol data unit PDU, a Radio Link Control RLC PDU, and a Media Access Control MAC PDU.

With reference to the foregoing fourth aspect or any implementation manner in the first possible implementation manner to the ninth possible implementation manner of the fourth aspect, in a tenth possible implementation manner, the first instruction information received by the receiver is carried in a first request message, and the first request message further carries at least one of measurement parameter information, measurement feedback time information, UE quantity feedback information, or the identifiers of the m cells;

the receiver is further configured to: after the processor establishes the first interface according to the first instruction information, receive the at least one, which is sent by the control node, of the measurement parameter information, the measurement feedback time information, the UE quantity feedback information, and the identifies of the m cells; and the processor is further configured to perform configuration on the established first interface according to the at least one, which is received by the receiver, of the measurement parameter information, the measurement feedback time information, the UE quantity feedback information, or the identifiers of the m cells.

With reference to the foregoing fourth aspect or any implementation manner in the first possible implementation manner to the tenth possible implementation manner of the fourth aspect, in an eleventh possible implementation manner, the resource configuration information received by the receiver includes at least one of time domain information of a resource, frequency domain information of the resource, space domain information of the resource, code domain information of the resource, transmit power information of the resource, or information about a time at which resource configuration may be performed; and the processor is further specifically configured to perform configuration according to the at least one, which is received by the receiver, of the time domain information of the resource in the m cells, the frequency domain information of the resource in the m cells, the space domain information of the resource in the m cells, the code domain information of the resource in the m cells, the transmit power information of the resource in the m cells, and the information about the time at which resource configuration may be performed in the m cells.

With reference to the foregoing fourth aspect or any implementation manner in the first possible implementation manner to the eleventh possible implementation manner of the fourth aspect, in a twelfth possible implementation manner, the receiver is further configured to: after configuration is performed according to the resource configuration information of the m cells, receive at least one cell identifier in the identifiers of the m cells and stop instruction information that are sent by the control node, where the stop instruction information is used to instruct to stop reporting measurement information of a cell;

the processor is further configured to stop, according to the at least one cell identifier and the stop instruction information that are received by the receiver, reporting measurement information of at least one cell corresponding to the at least one cell identifier; and the transmitter is further configured to send a first reply confirmation message to the control node, so that the control node stops, according to the first reply confirmation message, receiving the measurement information of the at least one cell.

With reference to the foregoing fourth aspect or any implementation manner in the first possible implementation manner to the eleventh possible implementation manner of the fourth aspect, in a thirteenth possible implementation manner, the receiver is further configured to: after configuration is performed according to the resource configuration information of the m cells, receive at least one cell identifier in the identifiers of the m cells and release instruction information that are sent by the control node, where the release instruction information is used to instruct to stop measuring a cell and reporting measurement information of the cell;

the processor is further configured to stop, according to the at least one cell identifier and the release instruction information that are received by the receiver, measuring at least one cell corresponding to the at least one cell identifier and reporting measurement information of the at least one cell; and the transmitter is further configured to send a second reply confirmation message to the control node, so that the control node stops, according to the second reply confirmation message, receiving the measurement information of the at least one cell.

With reference to the foregoing fourth aspect or any implementation manner in the first possible implementation manner to the thirteenth possible implementation manner of the fourth aspect, in a fourteenth possible implementation manner, an underlying bearer of the first interface established by the processor is Stream Control Transmission Protocol SCTP, and an underlying bearer of the second interface established by the processor is User Datagram Protocol UDP.

According to a fifth aspect, an embodiment of the present disclosure provides a coordinated communication method, including:

sending first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1;

receiving, by using the second interface, measurement information reported by each of the n first base stations, where the measurement information is measurement results of m cells, and the m cells are served by any base station in the n first base stations, and m≥1;

determining resource configuration information of the m cells according to the measurement information; and sending the resource configuration information of the m cells to each of the n first base stations by using the first interface, so that each of the n first base stations performs configuration according to the resource configuration information of the m cells.

In a first possible implementation manner of the fifth aspect, the second instruction information includes identifiers of the m cells and a first tunnel identifier and a first tunnel type identifier that are corresponding to the identifiers of the m cells.

With reference to the first possible implementation manner of the fifth aspect, in a second possible implementation manner, the second instruction information further includes an identifier of UE and a second tunnel identifier and at least one second tunnel type identifier that are corresponding to the identifier of the UE.

With reference to the second possible implementation manner of the fifth aspect, in a third possible implementation manner, the second instruction information further includes at least one bearer identifier corresponding to the UE, and each bearer identifier is corresponding to the at least one second tunnel type identifier.

With reference to any implementation manner in the first possible implementation manner to the third possible implementation manner of the fifth aspect, in a fourth possible implementation manner, the second interface includes m first tunnels corresponding to the first tunnel type identifier; and the receiving, by using the second interface, measurement information reported by each of the n first base stations specifically includes:

receiving, by using each first tunnel in the m first tunnels, the measurement information reported by each of the n first base stations.

With reference to the fourth possible implementation manner of the fifth aspect, in a fifth possible implementation manner, a frame format of a data packet transmitted in each first tunnel includes a frame header part and a data part; and the receiving, by using each first tunnel in the m first tunnels, the measurement information reported by each of the n first base stations specifically includes:

receiving, by using each first tunnel, the data packet reported by each of the n first base stations, where the data part in the data packet carries the measurement information.

With reference to the fourth possible implementation manner or the fifth possible implementation manner of the fifth aspect, in a sixth possible implementation manner, the second interface further includes at least one second tunnel in a one-to-one correspondence with the at least one second tunnel type identifier; and after the second instruction information is sent to the n first base stations, the method further includes:

sending a protocol data unit PDU data packet to the n first base stations by using each second tunnel in the at least one second tunnel, so that each of the n first base stations sends the PDU data packet to the UE, where the PDU data packet is corresponding to any tunnel type identifier in the at least one second tunnel type identifier.

With reference to the sixth possible implementation manner of the fifth aspect, in a seventh possible implementation manner, the sending the PDU data packet to the n first base stations by using each second tunnel in the at least one second tunnel specifically includes:

sending, to the n first base stations by using each second tunnel in the at least one second tunnel, the PDU data packet and a bearer identifier corresponding to the PDU data packet.

With reference to the foregoing fifth aspect or any implementation manner in the first possible implementation manner to the seventh possible implementation manner of the fifth aspect, in an eighth possible implementation manner, before the receiving, by using the second interface, measurement information reported by each of the n first base stations, the method further includes:

sending an enabling message to the n first base stations, where the enabling message is used to enable the n first base stations to report the measurement information by using the second interface.

With reference to any implementation manner in the second possible implementation manner to the eighth possible implementation manner of the fifth aspect, in a ninth possible implementation manner, the second tunnel type identifier includes a Packet Data Convergence Protocol PDCP protocol data unit PDU, a Radio Link Control RLC PDU, and a Media Access Control MAC PDU.

With reference to the foregoing fifth aspect or any implementation manner in the first possible implementation manner to the ninth possible implementation manner of the fifth aspect, in a tenth possible implementation manner, the first instruction information is carried in a first request message, and the first request message further carries at least one of measurement parameter information, measurement feedback time information, UE quantity feedback information, or the identifiers of the m cells; and after the first instruction information is sent to the n first base stations, the method further includes:

sending the at least one of the measurement parameter information, the measurement feedback time information, the UE quantity feedback information, or the identifiers of the m cells to each of the n first base stations, so that each of the n first base stations performs configuration on the first interface according to the at least one of the measurement parameter information, the measurement feedback time information, the UE quantity feedback information, or the identifiers of the m cells.

With reference to the foregoing fifth aspect or any implementation manner in the first possible implementation manner to the tenth possible implementation manner of the fifth aspect, in an eleventh possible implementation manner, the resource configuration information includes at least one of time domain information of a resource, frequency domain information of the resource, space domain information of the resource, code domain information of the resource, transmit power information of the resource, or information about a time at which resource configuration may be performed.

With reference to the foregoing fifth aspect or any implementation manner in the first possible implementation manner to the eleventh possible implementation manner of the fifth aspect, in a twelfth possible implementation manner, before the sending first instruction information and the second instruction information to each of n first base stations, the method further includes:

acquiring information about the n first base stations; and determining the n first base stations according to the information about the n first base stations.

With reference to the foregoing fifth aspect or any implementation manner in the first possible implementation manner to the twelfth possible implementation manner of the fifth aspect, in a thirteenth possible implementation manner, after the sending the resource configuration information of the m cells to each of the n first base stations by using the first interface, the method further includes:

sending at least one cell identifier in the identifiers of the m cells and stop instruction information to the n first base stations, so that each of the n first base stations stops, according to the at least one cell identifier and the stop instruction information, reporting measurement information of at least one cell corresponding to the at least one cell identifier, where the stop instruction information is used to instruct the n first base stations to stop reporting measurement information of a cell;

receiving a first reply confirmation message sent by each of the n first base stations; and stopping, according to the first reply confirmation message, receiving the measurement information of the at least one cell.

With reference to the foregoing fifth aspect or any implementation manner in the first possible implementation manner to the twelfth possible implementation manner of the fifth aspect, in a fourteenth possible implementation manner, after the sending the resource configuration information of the m cells to each of the n first base stations by using the first interface, the method further includes:

sending at least one cell identifier in the identifiers of the m cells and release instruction information to the n first base stations, so that each of the n first base stations stops, according to the at least one cell identifier and the release instruction information, measuring at least one cell corresponding to the at least one cell identifier and reporting measurement information of the at least one cell, where the release instruction information is used to instruct the n first base stations to stop measuring a cell and reporting measurement information of the cell;

receiving a second reply confirmation message sent by the n first base stations; and stopping, according to the second reply confirmation message, receiving the measurement information of the at least one cell.

With reference to the foregoing fifth aspect or any implementation manner in the first possible implementation manner to the fourteenth possible implementation manner of the fifth aspect, in a fifteenth possible implementation manner, an underlying bearer of the first interface is Stream Control Transmission Protocol SCTP, and an underlying bearer of the second interface is User Datagram Protocol UDP.

According to a sixth aspect, an embodiment of the present disclosure further provides a coordinated communication method, including:

receiving first instruction information and second instruction information that are sent by a control node, where the first instruction information is used to instruct to establish a first interface, and the second instruction information is used to instruct to establish a second interface;

establishing the first interface according to the first instruction information, and establishing the second interface according to the second instruction information;

sending measurement information to the control node by using the second interface, so that the control node determines resource configuration information of m cells according to the measurement information, where the measurement information is measurement results of the m cells, and the m cells are cells in a coordinated communication set, and m≥1;

receiving, by using the first interface, the resource configuration information of the m cells that is sent by the control node; and performing configuration according to the resource configuration information of the m cells.

In a first possible implementation manner of the sixth aspect, the second instruction information includes identifiers of the m cells and a first tunnel identifier and a first tunnel type identifier that are corresponding to the identifiers of the m cells; and the establishing the second interface according to the second instruction information specifically includes:

establishing m first tunnels according to the identifiers of the m cells, the first tunnel identifier, and the first tunnel type identifier.

With reference to the first possible implementation manner of the sixth aspect, in a second possible implementation manner, the second instruction information further includes an identifier of UE and a second tunnel identifier and at least one second tunnel type identifier that are corresponding to the identifier of the UE; and the establishing the second interface according to the second instruction information further specifically includes:

establishing at least one second tunnel according to the identifier of the UE, the second tunnel identifier, and the at least one second tunnel type identifier.

With reference to the second possible implementation manner of the sixth aspect, in a third possible implementation manner, the second instruction information further includes at least one bearer identifier corresponding to the UE, and each bearer identifier is corresponding to the at least one second tunnel type identifier; and the establishing the second interface according to the second instruction information further specifically includes:

establishing the at least one second tunnel according to the identifier of the UE, the second tunnel identifier, the at least one second tunnel type identifier, and the at least one bearer identifier.

With reference to any implementation manner in the first possible implementation manner to the third possible implementation manner of the sixth aspect, in a fourth possible implementation manner, the second interface includes the m first tunnels corresponding to the first tunnel type identifier; and the sending measurement information to the control node by using the second interface specifically includes:

sending the measurement information to the control node by using each first tunnel in the m first tunnels.

With reference to the fourth possible implementation manner of the sixth aspect, in a fifth possible implementation manner, a frame format of a data packet transmitted in each first tunnel includes a frame header part and a data part; and the sending the measurement information to the control node by using each first tunnel in the m first tunnels specifically includes:

sending the data packet to the control node by using each first tunnel, where the data part in the data packet carries the measurement information.

With reference to the fourth possible implementation manner or the fifth possible implementation manner of the sixth aspect, in a sixth possible implementation manner, the second interface further includes the at least one second tunnel in a one-to-one correspondence with the at least one second tunnel type identifier; and after the establishing the second interface according to the second instruction information, the method further includes:

receiving, by using each second tunnel in the at least one second tunnel, a protocol data unit PDU data packet sent by the control node, and sending the PDU data packet to the UE, where the PDU data packet is corresponding to any tunnel type identifier in the at least one second tunnel type identifier.

With reference to the sixth possible implementation manner of the sixth aspect, in a seventh possible implementation manner, the receiving, by using each second tunnel in the at least one second tunnel, a protocol data unit PDU data packet sent by the control node, and sending the PDU data packet to the UE specifically includes:

receiving, by using each second tunnel in the at least one second tunnel, the PDU data packet and at least one bearer identifier corresponding to the PDU data packet that are sent by the control node; and sending the PDU data packet and the at least one bearer identifier to a first entity of the UE, where the first entity is a protocol layer entity corresponding to the PDU data packet.

With reference to the foregoing sixth aspect or any implementation manner in the first possible implementation manner to the seventh possible implementation manner of the sixth aspect, in an eighth possible implementation manner, before the sending measurement information to the control node by using the second interface, the method further includes:

receiving an enabling message sent by the control node, where the enabling message is used to enable the measurement information to be reported by using the second interface.

With reference to any implementation manner in the second possible implementation manner to the eighth possible implementation manner of the sixth aspect, in a ninth possible implementation manner, the second tunnel type identifier includes a Packet Data Convergence Protocol PDCP protocol data unit PDU, a Radio Link Control RLC PDU, and a Media Access Control MAC PDU.

With reference to the foregoing sixth aspect or any implementation manner in the first possible implementation manner to the ninth possible implementation manner of the sixth aspect, in a tenth possible implementation manner, the first instruction information is carried in a first request message, and the first request message further carries at least one of measurement parameter information, measurement feedback time information, UE quantity feedback information, or the identifiers of the m cells; and after the establishing the first interface according to the first instruction information, the method further includes:

receiving the at least one, which is sent by the control node, of the measurement parameter information, the measurement feedback time information, the UE quantity feedback information, or the identifiers of the m cells; and performing configuration on the first interface according to the at least one of the measurement parameter information, the measurement feedback time information, the UE quantity feedback information, or the identifiers of the m cells.

With reference to the foregoing sixth aspect or any implementation manner in the first possible implementation manner to the tenth possible implementation manner of the sixth aspect, in an eleventh possible implementation manner, the resource configuration information includes at least one of time domain information of a resource, frequency domain information of the resource, space domain information of the resource, code domain information of the resource, transmit power information of the resource, or information about a time at which resource configuration may be performed; and the performing configuration according to the resource configuration information of the m cells specifically includes:

performing configuration according to the at least one of the time domain information of the resource in the m cells, the frequency domain information of the resource in the m cells, the space domain information of the resource in the m cells, the code domain information of the resource in the m cells, the transmit power information of the resource in the m cells, and the information about the time at which resource configuration may be performed in the m cells.

With reference to the foregoing sixth aspect or any implementation manner in the first possible implementation manner to the eleventh possible implementation manner of the sixth aspect, in a twelfth possible implementation manner, after the performing configuration according to the resource configuration information of the m cells, the method further includes:

receiving at least one cell identifier in the identifiers of the m cells and stop instruction information that are sent by the control node, where the stop instruction information is used to instruct to stop reporting measurement information of a cell;

stopping, according to the at least one cell identifier and the stop instruction information, reporting measurement information of at least one cell corresponding to the at least one cell identifier; and sending a first reply confirmation message to the control node, so that the control node stops, according to the first reply confirmation message, receiving the measurement information of the at least one cell.

With reference to the foregoing sixth aspect or any implementation manner in the first possible implementation manner to the eleventh possible implementation manner of the sixth aspect, in a thirteenth possible implementation manner, after the performing configuration according to the resource configuration information of the m cells, the method further includes:

receiving at least one cell identifier in the identifiers of the m cells and release instruction information that are sent by the control node, where the release instruction information is used to instruct to stop measuring a cell and reporting measurement information of the cell;

stopping, according to the at least one cell identifier and the release instruction information, measuring at least one cell corresponding to the at least one cell identifier and reporting measurement information of the at least one cell; and sending a second reply confirmation message to the control node, so that the control node stops, according to the second reply confirmation message, receiving the measurement information of the at least one cell.

With reference to the foregoing sixth aspect or any implementation manner in the first possible implementation manner to the thirteenth possible implementation manner of the sixth aspect, in a fourteenth possible implementation manner, an underlying bearer of the first interface is Stream Control Transmission Protocol SCTP, and an underlying bearer of the second interface is User Datagram Protocol UDP.

According to a seventh aspect, an embodiment of the present disclosure provides a coordinated communication system, including:

the control node described in the first or third aspect and n first base stations described in the second or fourth aspect, where n≥1.

According to the coordinated communication method and system and the apparatus provided in the embodiments of the present disclosure, first instruction information and second instruction information are sent to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1; measurement information reported by each of the n first base stations is received by using the second interface, where the measurement information is measurement results of m cells, and the m cells are served by any one of the n first base stations, and m≥1; resource configuration information of the m cells is determined according to the measurement information; and finally, the resource configuration information of the m cells is sent to each of the n first base stations by using the first interface, so that each of the n first base stations performs configuration according to the resource configuration information of the m cells. In the solution, a control node receives the measurement information by using the second interface, that is, a user plane interface, so that the measurement information is transmitted more quickly, and the control node sends the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
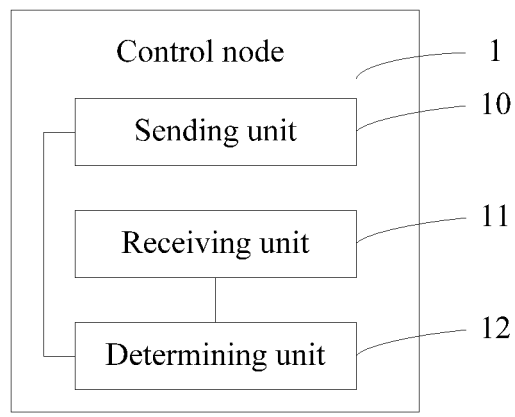
FIG. 1 is a schematic structural diagram 1 of a control node according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Various technologies described in this specification may be applied to various wireless communications systems, for example, current 2G and 3G communications systems and a next-generation communications system, for example, GSM (Global System for Mobile Communications), a CDMA (Code Division Multiple Access) system, a TDMA (Time Division Multiple Access) system, a WCDMA (, Wideband Code Division Multiple Access) system, an FDMA (Frequency Division Multiple Access) system, an OFDMA (Orthogonal Frequency-Division Multiple Access) system, an SC-FDMA (single carrier frequency division multiple access) system, a GPRS (general packet radio service) system, an LTE system, and another such communications system.

UE may be a wireless terminal or may be a wired terminal. The wireless terminal may refer to a device that provides only voice and/or data connectivity for a user, a handheld device with a radio connection function, or another processing device connected to a radio modem. The wireless terminal may communicate with one or more core networks by using a RAN radio access network). The wireless terminal may be a mobile terminal such as a mobile phone (or referred to as a "cellular" phone) or a computer with a mobile terminal, for example, may be a portable, pocket-sized, handheld, computer built-in, or in-vehicle mobile apparatus, which exchanges voice and/or data with the radio access network; for example, a device such as a PCS (personal communications service) phone, a cordless telephone set, a Session Initiation Protocol (SIP) phone, a WLL (wireless local loop) station, or a PDA (personal digital assistant). The wireless terminal may also be called a system, a subscriber unit, a subscriber station, a mobile station, a mobile terminal, a remote station, an access point, a remote terminal, an access terminal, a user terminal, a user agent, or user equipment.

It may be learned from descriptions in the background that coordinated communication refers to a technology in which multiple base stations or multiple base stations and antenna site remote radio units in a system perform multipoint transmission/reception at the same time, and UE establishes an uplink and a downlink with the multiple base stations and antenna sites for communication. A fiber may be used for mesh interconnection between a base station and multiple antenna sites and between multiple base stations. Specifically, an antenna site is inserted into a network, or a distributed antenna system is formed on the basis of an existing site, to perform transmission and reception with UE for multiple times, which is referred to as a CoMP (coordinated multipoint transmission/reception) technology. Multiple base stations directly perform communication with UE by means of fiber interconnection by using an existing network, which is referred to as an inter-base-station coordination technology. The two forms are practical applications of coordinated communication.

Embodiment 1

As shown in FIG. 1, this embodiment of the present disclosure provides a control node 1, and the control node 1 may include:

a sending unit 10, configured to send first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1;

a receiving unit 11, configured to receive, by using the second interface, measurement information reported by each of the n first base stations, where the measurement information is measurement results of m cells, and the m cells are served by any base station in the n first base stations, and m≥1; and a determining unit 12, configured to determine resource configuration information of the m cells according to the measurement information received by the receiving unit 11.

The sending unit 10 is further configured to send, to each of the n first base stations by using the first interface, the resource configuration information of the m cells that is determined by the determining unit 12, so that each of the n first base stations performs configuration according to the resource configuration information of the m cells.

Optionally, the second instruction information sent by the sending unit 10 includes identifiers of the m cells and a first tunnel identifier and a first tunnel type identifier that are corresponding to the identifiers of the m cells.

Optionally, the second instruction information sent by the sending unit 10 further includes an identifier of UE and a second tunnel identifier and at least one second tunnel type identifier that are corresponding to the identifier of the UE.

Optionally, the second instruction information sent by the sending unit 10 further includes at least one bearer identifier corresponding to the UE, and each bearer identifier is corresponding to the at least one second tunnel type identifier.

Optionally, the second interface includes m first tunnels corresponding to the first tunnel type identifier sent by the sending unit 10; and the receiving unit 11 is specifically configured to receive, by using each first tunnel in the m first tunnels, the measurement information reported by each of the n first base stations.

Optionally, a frame format of a data packet transmitted in each first tunnel includes a frame header part and a data part; and the receiving unit 11 is further specifically configured to receive, by using each first tunnel, the data packet reported by each of the n first base stations, where the data part in the data packet carries the measurement information.

Optionally, the second interface further includes at least one second tunnel in a one-to-one correspondence with the at least one second tunnel type identifier sent by the sending unit 10; and the sending unit 10 is further configured to: after sending the second instruction information to the n first base stations, send a PDU (protocol data unit) data packet to the n first base stations by using each second tunnel in the at least one second tunnel, so that each of the n first base stations sends the PDU data packet to the UE, where the PDU data packet is corresponding to any tunnel type identifier in the at least one second tunnel type identifier.

Optionally, the sending unit 10 is specifically configured to send, to the n first base stations by using each second tunnel in the at least one second tunnel, the PDU data packet and a bearer identifier corresponding to the PDU data packet.

Optionally, the sending unit 10 is further configured to: before the receiving unit 11 receives, by using the second interface, the measurement information reported by each of the n first base stations, send an enabling message to the n first base stations, where the enabling message is used to enable the n first base stations to report the measurement information by using the second interface.

Optionally, the second tunnel type identifier sent by the sending unit 10 includes a Packet Data Convergence Protocol PDCP protocol data unit PDU, a Radio Link Control RLC PDU, and a Media Access Control MAC PDU.

Optionally, the first instruction information sent by the sending unit 10 is carried in a first request message, and the first request message further carries at least one of measurement parameter information, measurement feedback time information, UE quantity feedback information, or the identifiers of the m cells; and the sending unit 10 is further configured to: after sending the first instruction information to the n first base stations, send the at least one of the measurement parameter information, the measurement feedback time information, the UE quantity feedback information, or the identifiers of the m cells to each of the n first base stations, so that each of the n first base stations performs configuration on the first interface according to the at least one of the measurement parameter information, the measurement feedback time information, the UE quantity feedback information, or the identifiers of the m cells.

Optionally, the resource configuration information determined by the determining unit 12 includes at least one of time domain information of a resource, frequency domain information of the resource, space domain information of the resource, code domain information of the resource, transmit power information of the resource, or information about a time at which resource configuration may be performed.

Figure 2:
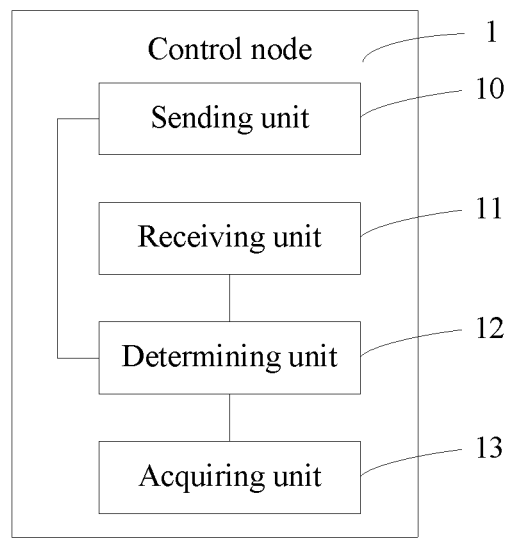
FIG. 2 is a schematic structural diagram 2 of a control node according to an embodiment of the present disclosure.

Optionally, as shown in FIG. 2, the control node further includes an acquiring unit 13.

The acquiring unit 13 is configured to acquire information about the n first base stations before the sending unit 10 sends the first instruction information and the second instruction information to each of the n first base stations.

The determining unit 12 is further configured to determine the n first base stations according to the information about the n first base stations acquired by the acquiring unit 13.

Figure 3:
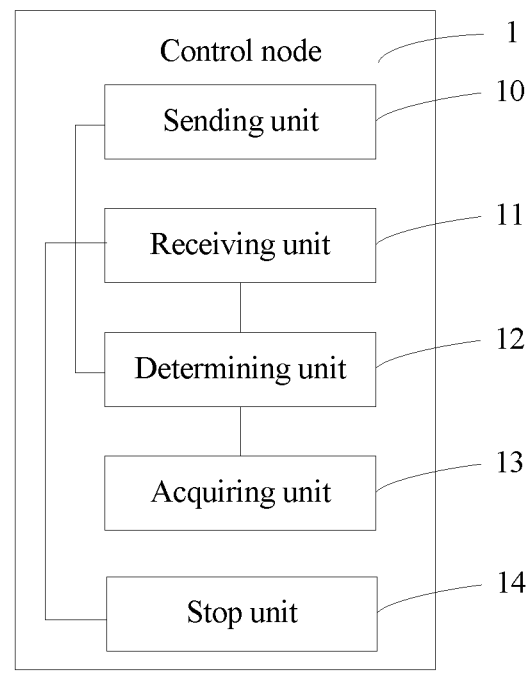
FIG. 3 is a schematic structural diagram 3 of a control node according to an embodiment of the present disclosure.

Optionally, as shown in FIG. 3, the control node further includes a stop unit 14.

The sending unit 10 is further configured to: after sending the resource configuration information of the m cells to each of the n first base stations by using the first interface, send at least one cell identifier in the identifiers of the m cells and stop instruction information to the n first base stations, so that each of the n first base stations stops, according to the at least one cell identifier and the stop instruction information, reporting measurement information of at least one cell corresponding to the at least one cell identifier, where the stop instruction information is used to instruct the n first base stations to stop reporting measurement information of a cell.

The receiving unit 11 is further configured to receive a first reply confirmation message sent by each of the n first base stations.

The stop unit 14 is configured to stop, according to the first reply confirmation message received by the receiving unit 11, receiving the measurement information of the at least one cell.

Optionally, as shown in FIG. 3, the control node further includes a stop unit 14.

The sending unit 10 is further configured to: after sending the resource configuration information of the m cells to each of the n first base stations by using the first interface, send at least one cell identifier in the identifiers of the m cells and release instruction information to the n first base stations, so that each of the n first base stations stops, according to the at least one cell identifier and the release instruction information, measuring at least one cell corresponding to the at least one cell identifier and reporting measurement information of the at least one cell, where the release instruction information is used to instruct the n first base stations to stop measuring a cell and reporting measurement information of the cell.

The receiving unit 11 is further configured to receive a second reply confirmation message sent by the n first base stations.

The stop unit 14 is configured to stop, according to the second reply confirmation message received by the receiving unit 11, receiving the measurement information of the at least one cell.

Optionally, an underlying bearer of the first interface is Stream Control Transmission Protocol SCTP (Stream Control Transmission Protocol), and an underlying bearer of the second interface is User Datagram Protocol UDP (User Datagram Protocol).

This embodiment of the present disclosure provides a control node. The control node sends first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1. The control node receives, by using the second interface, measurement information reported by each of the n first base stations, where the measurement information is measurement results of m cells, and the m cells are served by any one of the n first base stations, and m≥1. The control node determines resource configuration information of the m cells according to the measurement information. Finally, the control node sends the resource configuration information of the m cells to each of the n first base stations by using the first interface, so that each of the n first base stations performs configuration according to the resource configuration information of the m cells. In the solution, the control node receives the measurement information by using the second interface, that is, a user plane interface, so that the measurement information is transmitted more quickly, and the control node sends the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

Figure 4:
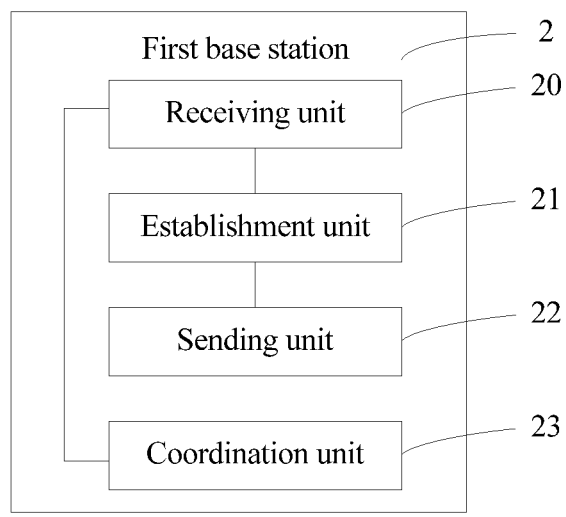
FIG. 4 is a schematic structural diagram 1 of a first base station according to an embodiment of the present disclosure.

As shown in FIG. 4, this embodiment of the present disclosure further provides a first base station 2, which is corresponding to a coordinated communication method on a base station side, and the first base station 2 may include:

a receiving unit 20, configured to receive first instruction information and second instruction information that are sent by a control node, where the first instruction information is used to instruct to establish a first interface, and the second instruction information is used to instruct to establish a second interface;

an establishment unit 21, configured to: establish the first interface according to the first instruction information received by the receiving unit 20, and establish the second interface according to the second instruction information received by the receiving unit 20;

a sending unit 22, configured to send measurement information to the control node by using the second interface established by the establishment unit 21, so that the control node determines resource configuration information of m cells according to the measurement information, where the measurement information is measurement results of the m cells, and the m cells are cells in a coordinated communication set, and m≥1; where the receiving unit 20 is further configured to receive, by using the first interface established by the establishment unit 21, the resource configuration information of the m cells that is sent by the control node; and a coordination unit 23, configured to perform configuration according to the resource configuration information of the m cells that is received by the receiving unit 20.

Optionally, the second instruction information received by the receiving unit 20 includes identifiers of the m cells and a first tunnel identifier and a first tunnel type identifier that are corresponding to the identifiers of the m cells; and the establishment unit 21 is specifically configured to establish m first tunnels according to the identifiers of the m cells, the first tunnel identifier, and the first tunnel type identifier that are received by the receiving unit 20.

Optionally, the second instruction information received by the receiving unit 20 further includes an identifier of UE and a second tunnel identifier and at least one second tunnel type identifier that are corresponding to the identifier of the UE; and the establishment unit 21 is further specifically configured to establish at least one second tunnel according to the identifier of the UE, the second tunnel identifier, and the at least one second tunnel type identifier that are received by the receiving unit 20.

Optionally, the second instruction information received by the receiving unit 20 further includes at least one bearer identifier corresponding to the UE, and each bearer identifier is corresponding to the at least one second tunnel type identifier; and the establishment unit 21 is further specifically configured to establish the at least one second tunnel according to the identifier of the UE, the second tunnel identifier, the at least one second tunnel type identifier, and the at least one bearer identifier that are received by the receiving unit 20.

Optionally, the second interface established by the establishment unit 21 includes the m first tunnels corresponding to the first tunnel type identifier received by the receiving unit 20; and the sending unit 22 is specifically configured to send the measurement information to the control node by using each first tunnel in the m first tunnels established by the establishment unit 21.

Optionally, a frame format of a data packet transmitted in each first tunnel established by the establishment unit 21 includes a frame header part and a data part; and the sending unit 22 is further specifically configured to send the data packet to the control node by using each first tunnel established by the establishment unit 21, where the data part in the data packet carries the measurement information.

Optionally, the second interface established by the establishment unit 21 further includes the at least one second tunnel in a one-to-one correspondence with the at least one second tunnel type identifier received by the receiving unit 20;

the receiving unit 20 is further configured to: after the establishment unit 21 establishes the second interface according to the second instruction information, receive, by using each second tunnel in the at least one second tunnel established by the establishment unit 21, a protocol data unit PDU data packet sent by the control node; and the sending unit 22 is further configured to send the PDU data packet received by the receiving unit 20 to the UE, where the PDU data packet is corresponding to any tunnel type identifier in the at least one second tunnel type identifier.

Optionally, the receiving unit 20 is specifically configured to receive, by using each second tunnel in the at least one second tunnel, the PDU data packet and at least one bearer identifier corresponding to the PDU data packet that are sent by the control node.

The sending unit 22 is further specifically configured to send the PDU data packet and the at least one bearer identifier that are received by the receiving unit 20 to a first entity of the UE, where the first entity is a protocol layer entity corresponding to the PDU data packet.

Optionally, the receiving unit 20 is further configured to: before the sending unit 22 sends the measurement information to the control node by using the second interface established by the establishment unit 21, receive an enabling message sent by the control node, where the enabling message is used to enable the measurement information to be reported by using the second interface.

Optionally, the second tunnel type identifier received by the receiving unit 20 includes a Packet Data Convergence Protocol PDCP protocol data unit PDU, a Radio Link Control RLC PDU, and a Media Access Control MAC PDU.

Figure 5:
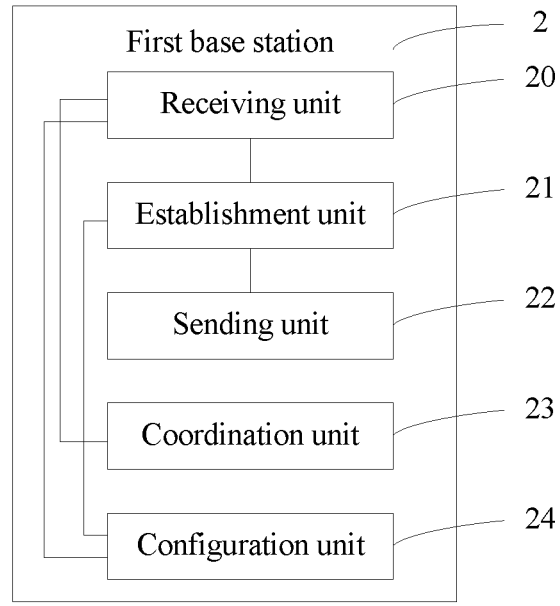
FIG. 5 is a schematic structural diagram 2 of a first base station according to an embodiment of the present disclosure.

Optionally, as shown in FIG. 5, the first instruction information received by the receiving unit 20 is carried in a first request message, the first request message further carries at least one of measurement parameter information, measurement feedback time information, UE quantity feedback information, or the identifiers of the m cells, and the first base station 2 further includes a configuration unit 24.

The receiving unit 20 is further configured to: after the establishment unit 21 establishes the first interface according to the first instruction information, receive the at least one, which is sent by the control node, of the measurement parameter information, the measurement feedback time information, the UE quantity feedback information, and the identifies of the m cells.

The configuration unit 24 is configured to perform, according to the at least one, which is received by the receiving unit 20, of the measurement parameter information, the measurement feedback time information, the UE quantity feedback information, or the identifiers of the m cells, configuration on the first interface established by the establishment unit 21.

Optionally, the resource configuration information received by the receiving unit 20 includes at least one of time domain information of a resource, frequency domain information of the resource, space domain information of the resource, code domain information of the resource, transmit power information of the resource, or information about a time at which resource configuration may be performed; and the coordination unit 23 is specifically configured to perform configuration according to the at least one, which is received by the receiving unit 20, of the time domain information of the resource in the m cells, the frequency domain information of the resource in the m cells, the space domain information of the resource in the m cells, the code domain information of the resource in the m cells, the transmit power information of the resource in the m cells, and the information about the time at which resource configuration may be performed in the m cells.

Figure 6:
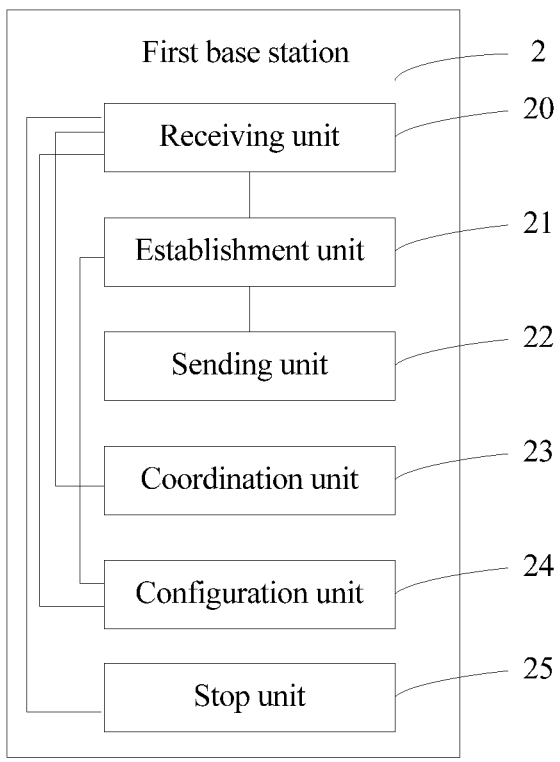
FIG. 6 is a schematic structural diagram 3 of a first base station according to an embodiment of the present disclosure.

Optionally, as shown in FIG. 6, the first base station further includes a stop unit 25.

The receiving unit 20 is further configured to: after configuration is performed according to the resource configuration information of the m cells, receive at least one cell identifier in the identifiers of the m cells and stop instruction information that are sent by the control node, where the stop instruction information is used to instruct to stop reporting measurement information of a cell.

The stop unit 25 is configured to stop, according to the at least one cell identifier and the stop instruction information that are received by the receiving unit 20, reporting measurement information of at least one cell corresponding to the at least one cell identifier.

The sending unit 22 is further configured to send a first reply confirmation message to the control node, so that the control node stops, according to the first reply confirmation message, receiving the measurement information of the at least one cell.

Optionally, as shown in FIG. 6, the first base station further includes a stop unit 25.

The receiving unit 20 is further configured to: after configuration is performed according to the resource configuration information of the m cells, receive at least one cell identifier in the identifiers of the m cells and release instruction information that are sent by the control node, where the release instruction information is used to instruct to stop measuring a cell and reporting measurement information of the cell.

The stop unit 25 is configured to stop, according to the at least one cell identifier and the release instruction information that are received by the receiving unit 20, measuring at least one cell corresponding to the at least one cell identifier and reporting measurement information of the at least one cell.

The sending unit 22 is further configured to send a second reply confirmation message to the control node, so that the control node stops, according to the second reply confirmation message, receiving the measurement information of the at least one cell.

Optionally, an underlying bearer of the first interface established by the establishment unit 21 is SCTP, and an underlying bearer of the second interface established by the establishment unit 21 is UDP.

Figure 7:
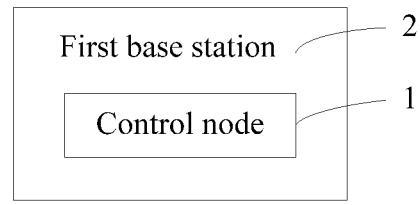
FIG. 7 is a schematic structural diagram 4 of a control node according to an embodiment of the present disclosure.
Figure 8:
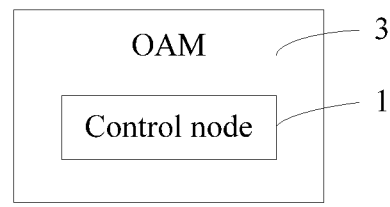
FIG. 8 is a schematic structural diagram 5 of a control node according to an embodiment of the present disclosure.

It should be noted that the control node 1 may be an independently disposed node. With reference to FIG. 7 and FIG. 8, it may be learned that the control node 1 may be integrated into a processor of the first base station 2 for implementation, and the processor of the first base station 2 invokes and executes the foregoing functions of the control node 1. In addition, alternatively, the control node 1 may be integrated into OAM (operation, administration and maintenance) 3, and the OAM 3 invokes and executes the foregoing functions of the control node 1. The processor described herein may be a central processing unit (CPU), or an application-specific integrated circuit (ASIC), or one or more integrated circuits configured to implement this embodiment of the present disclosure.

Figure 9:
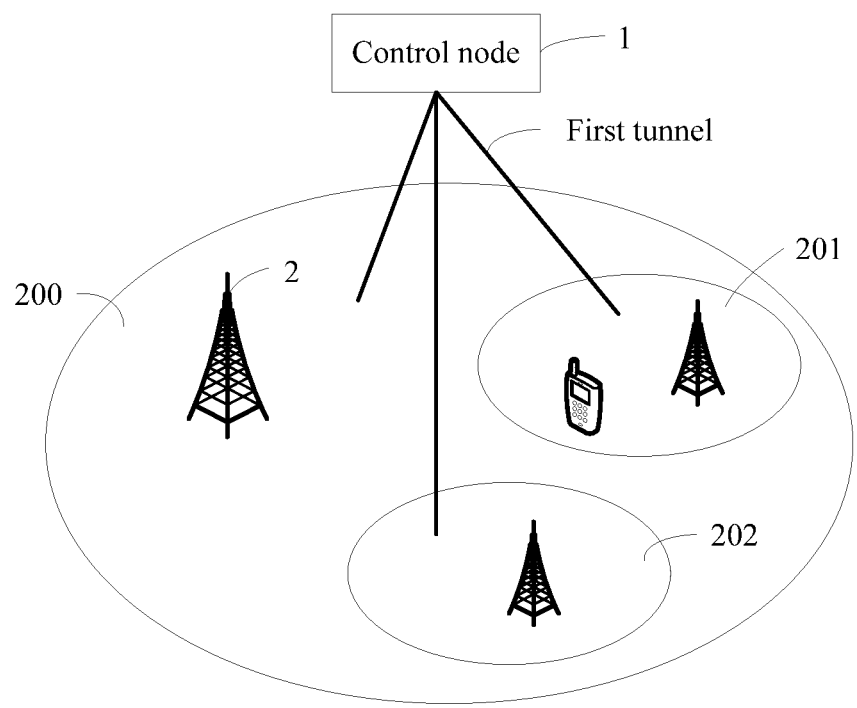
FIG. 9 is a schematic structural diagram of a first tunnel established between a control node and a first base station according to an embodiment of the present disclosure.
Figure 10:
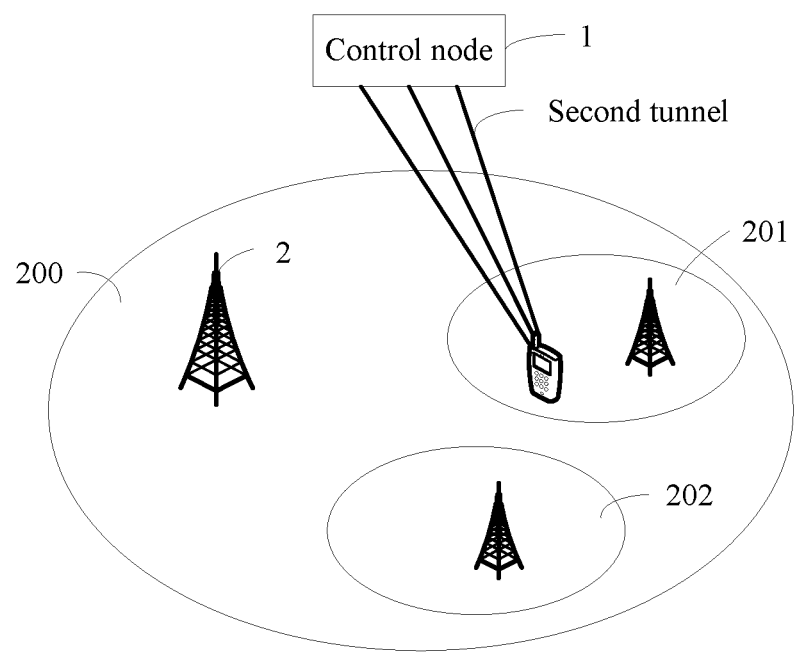
FIG. 10 is a schematic structural diagram of a second tunnel established between a control node and a first base station according to an embodiment of the present disclosure.

The following briefly describes usage of a first tunnel and a second tunnel. In this embodiment of the present disclosure, as shown in FIG. 9, 200 in the figure is a cell set in the coordinated communication set described in this embodiment of the present disclosure, each of 201 and 202 may be any cell in the coordinated communication set, and the control node 1 may perform transmission of measurement information of the cell 201 or the cell 202 with the first base station 2 by using the first tunnel. As shown in FIG. 10, 200 in the figure is a cell set in the coordinated communication set described in this embodiment of the present disclosure, each of 201 and 202 may be any cell in the coordinated communication set, and the control node 1 may perform, by using the second tunnel, transmission of a PDU data packet with UE served by the first base station 2. A specific method for implementing communication between the control node 1 and the first base station 2 is described in detail in a subsequent embodiment, and details are not described herein again.

This embodiment of the present disclosure provides a first base station. The first base station receives first instruction information and second instruction information that are sent by a control node, where the first instruction information is used to instruct to establish a first interface, and the second instruction information is used to instruct to establish a second interface. The first base station establishes the first interface according to the first instruction information, and establishes the second interface according to the second instruction information. The first base station sends measurement information to the control node by using the second interface, so that the control node determines resource configuration information of m cells according to the measurement information, where the measurement information is measurement results of the m cells, and the m cells are cells in a coordinated communication set, and m≥1. Then, the first base station receives, by using the first interface, the resource configuration information of the m cells that is sent by the control node. Finally, the first base station performs configuration according to the resource configuration information of the m cells. In the solution, the first base station sends the measurement information by using the second interface, that is, a user plane interface, so that the measurement information is transmitted more quickly, and the first base station receives the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

Embodiment 2

Figure 11:
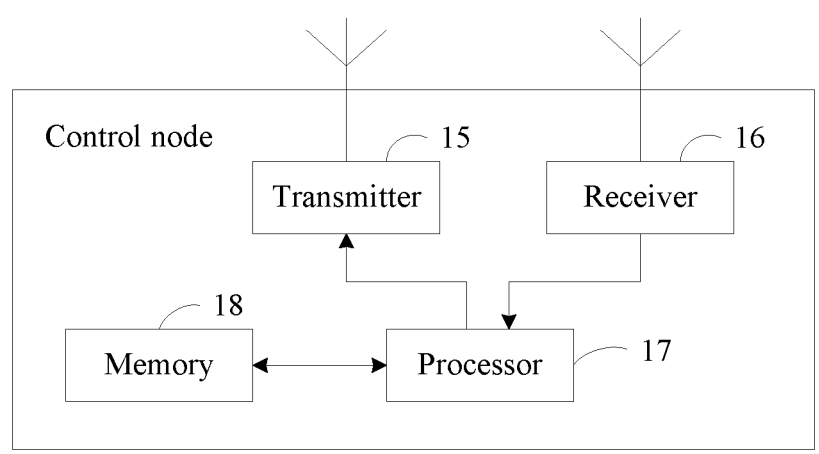
FIG. 11 is a schematic structural diagram 6 of a control node according to an embodiment of the present disclosure.

As shown in FIG. 11, this embodiment of the present disclosure provides a control node, which is corresponding to a coordinated communication method on a control node side. The control node may include a transmitter 15, a receiver 16, a processor 17, and a memory 18. The transmitter 15, the receiver 16, and the memory 18 are all connected to the processor 17; for example, the transmitter 15, the receiver 16, and the memory 18 may be all connected to the processor 17 by using a bus.

The receiver 16 and the transmitter 15 may be integrated to constitute a transceiver.

The memory 18 is configured to store executable program code, where the program code includes a computer operation instruction. The memory 18 may include a high-speed RAM memory, and may further include a non-volatile memory, for example, at least one disk memory.

The processor 17 may be a central processing unit, or an application-specific integrated circuit, or one or more integrated circuits configured to implement this embodiment of the present disclosure.

Specifically, the transmitter 15 may be configured to: send first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1. The receiver 16 may be configured to receive, by using the second interface, measurement information reported by each of the n first base stations, where the measurement information is measurement results of m cells, and the m cells are served by any base station in the n first base stations, and m≥1. The processor 17 may be configured to determine resource configuration information of the m cells according to the measurement information received by the receiver 16. The transmitter 15 is further configured to send, to each of the n first base stations by using the first interface, the resource configuration information of the m cells that is determined by the processor 17, so that each of the n first base stations performs configuration according to the resource configuration information of the m cells. Finally, the memory 18 may be configured to store software code of the measurement information, software code of resource coordination information of the m cells, software code of the first instruction information, software code of the second instruction information, and a software program for controlling the control node to complete the foregoing process, so that the processor 17 completes the foregoing process by executing the foregoing software program and invoking the foregoing software code.

Optionally, the second instruction information sent by the transmitter 15 includes identifiers of the m cells and a first tunnel identifier and a first tunnel type identifier that are corresponding to the identifiers of the m cells.

Optionally, the second instruction information sent by the transmitter 15 further includes an identifier of UE and a second tunnel identifier and at least one second tunnel type identifier that are corresponding to the identifier of the UE.

Optionally, the second instruction information sent by the transmitter 15 further includes at least one bearer identifier corresponding to the UE, and each bearer identifier is corresponding to the at least one second tunnel type identifier.

Optionally, the second interface includes m first tunnels corresponding to the first tunnel type identifier sent by the transmitter 15; and the receiver 16 is specifically configured to receive, by using each first tunnel in the m first tunnels, the measurement information reported by each of the n first base stations.

Optionally, a frame format of a data packet transmitted in each first tunnel includes a frame header part and a data part; and the receiver 16 is further specifically configured to receive, by using each first tunnel, the data packet reported by each of the n first base stations, where the data part in the data packet carries the measurement information.

Optionally, the second interface further includes at least one second tunnel in a one-to-one correspondence with the at least one second tunnel type identifier sent by the transmitter 15; and the transmitter 15 is further configured to: after sending the second instruction information to the n first base stations, send a protocol data unit PDU data packet to the n first base stations by using each second tunnel in the at least one second tunnel, so that each of the n first base stations sends the PDU data packet to the UE, where the PDU data packet is corresponding to any tunnel type identifier in the at least one second tunnel type identifier.

Optionally, the transmitter 15 is specifically configured to send, to the n first base stations by using each second tunnel in the at least one second tunnel, the PDU data packet and a bearer identifier corresponding to the PDU data packet.

Optionally, the transmitter 15 is further configured to: before the receiver 16 receives, by using the second interface, the measurement information reported by each of the n first base stations, send an enabling message to the n first base stations, where the enabling message is used to enable the n first base stations to report the measurement information by using the second interface.

Optionally, the second tunnel type identifier sent by the transmitter 15 includes a Packet Data Convergence Protocol PDCP protocol data unit PDU, a Radio Link Control RLC PDU, and a Media Access Control MAC PDU.

Optionally, the first instruction information sent by the transmitter 15 is carried in a first request message, and the first request message further carries at least one of measurement parameter information, measurement feedback time information, UE quantity feedback information, or the identifiers of the m cells; and the transmitter 15 is further configured to: after sending the first instruction information to the n first base stations, send the at least one of the measurement parameter information, the measurement feedback time information, the UE quantity feedback information, or the identifiers of the m cells to each of the n first base stations, so that each of the n first base stations performs configuration on the first interface according to the at least one of the measurement parameter information, the measurement feedback time information, the UE quantity feedback information, or the identifiers of the m cells.

Optionally, the resource configuration information determined by the processor 17 includes at least one of time domain information of a resource, frequency domain information of the resource, space domain information of the resource, code domain information of the resource, transmit power information of the resource, or information about a time at which resource configuration may be performed.

Optionally, the processor 17 is further configured to: before the transmitter 15 sends the first instruction information and the second instruction information to each of the n first base stations, acquire information about the n first base stations, and determine the n first base stations according to the acquired information about the n first base stations.

Optionally, the transmitter 15 is further configured to: after sending the resource configuration information of the m cells to each of the n first base stations by using the first interface, send at least one cell identifier in the identifiers of the m cells and stop instruction information to the n first base stations, so that each of the n first base stations stops, according to the at least one cell identifier and the stop instruction information, reporting measurement information of at least one cell corresponding to the at least one cell identifier, where the stop instruction information is used to instruct the n first base stations to stop reporting measurement information of a cell.

The receiver 16 is further configured to receive a first reply confirmation message sent by each of the n first base stations.

The processor 17 is further configured to stop, according to the first reply confirmation message received by the receiver 16, receiving the measurement information of the at least one cell.

Optionally, the transmitter 15 is further configured to: after sending the resource configuration information of the m cells to each of the n first base stations by using the first interface, send at least one cell identifier in the identifiers of the m cells and release instruction information to the n first base stations, so that each of the n first base stations stops, according to the at least one cell identifier and the release instruction information, measuring at least one cell corresponding to the at least one cell identifier and reporting measurement information of the at least one cell, where the release instruction information is used to instruct the n first base stations to stop measuring a cell and reporting measurement information of the cell.

The receiver 16 is further configured to receive a second reply confirmation message sent by the n first base stations.

The processor 17 is further configured to stop, according to the second reply confirmation message received by the receiver 16, receiving the measurement information of the at least one cell.

Optionally, an underlying bearer of the first interface is SCTP, and an underlying bearer of the second interface is UDP.

It should be noted that the control node provided in this embodiment of the present disclosure may include a base station, OAM, an independent communication node, and the like.

This embodiment of the present disclosure provides a control node. The control node sends first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1. The control node receives, by using the second interface, measurement information reported by each of the n first base stations, where the measurement information is measurement results of m cells, and the m cells are served by any one of the n first base stations, and m≥1. The control node determines resource configuration information of the m cells according to the measurement information. Finally, the control node sends the resource configuration information of the m cells to each of the n first base stations by using the first interface, so that each of the n first base stations performs configuration according to the resource configuration information of the m cells. In the solution, the control node receives the measurement information by using the second interface, that is, a user plane interface, so that the measurement information is transmitted more quickly, and the control node sends the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

Figure 12:
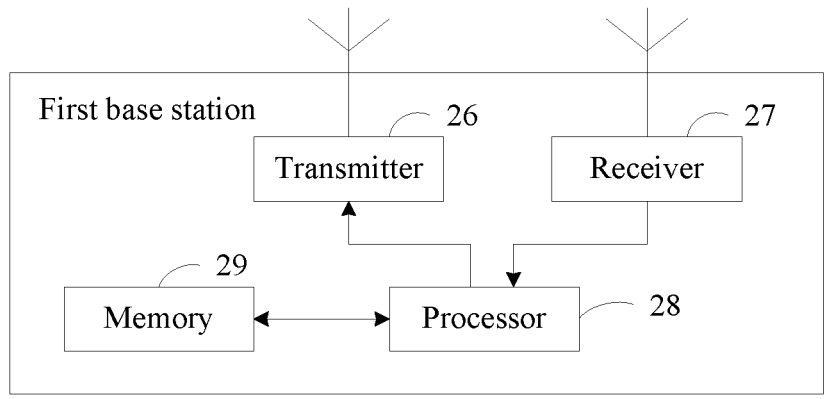
FIG. 12 is a schematic structural diagram 4 of a first base station according to an embodiment of the present disclosure.

As shown in FIG. 12, this embodiment of the present disclosure provides a first base station, which is corresponding to a coordinated communication method on a base station side. The first base station may include a transmitter 26, a receiver 27, a processor 28, and a memory 29. The transmitter 26, the receiver 27, and the memory 29 are all connected to the processor 28; for example, the transmitter 26, the receiver 27, and the memory 29 may be all connected to the processor 28 by using a bus. Certainly, the base station may further include general components, such as an antenna, a baseband processing component, an intermediate radio frequency processing component, and an input and output apparatus, which is not limited herein again in this embodiment of the present disclosure.

The receiver 27 and the transmitter 26 may be integrated to constitute a transceiver.

The memory 29 is configured to store executable program code, where the program code includes a computer operation instruction. The memory 29 may include a high-speed RAM memory, and may further include a non-volatile memory, for example, at least one disk memory.

The processor 28 may be a central processing unit, or an application-specific integrated circuit, or one or more integrated circuits configured to implement this embodiment of the present disclosure.

Specifically, the receiver 27 may be configured to receive first instruction information and second instruction information that are sent by a control node, where the first instruction information is used to instruct to establish a first interface, and the second instruction information is used to instruct to establish a second interface. The processor 28 may be configured to: establish the first interface according to the first instruction information received by the receiver 27, and establish the second interface according to the second instruction information received by the receiver 27. The transmitter 26 may be configured to send measurement information to the control node by using the second interface established by the processor 28, so that the control node determines resource configuration information of m cells according to the measurement information, where the measurement information is measurement results of the m cells, and the m cells are cells in a coordinated communication set, and m≥1. The receiver 27 is further configured to receive, by using the first interface established by the processor 28, the resource configuration information of the m cells that is sent by the control node. The processor 28 is further configured to perform configuration according to the resource configuration information of the m cells that is received by the receiver 27. The memory 29 may be further configured to store software code of the measurement information, software code of resource coordination information of the m cells, software code of the first instruction information, software code of the second instruction information, and a software program for controlling the first base station to complete the foregoing process, so that the processor 28 completes the foregoing process by executing the foregoing software program and invoking the foregoing software code.

Optionally, the second instruction information received by the receiver 27 includes identifiers of the m cells and a first tunnel identifier and a first tunnel type identifier that are corresponding to the identifiers of the m cells; and the processor 28 is specifically configured to establish m first tunnels according to the identifiers of the m cells, the first tunnel identifier, and the first tunnel type identifier that are received by the receiver 27.

Optionally, the second instruction information received by the receiver 27 further includes an identifier of UE and a second tunnel identifier and at least one second tunnel type identifier that are corresponding to the identifier of the UE; and the processor 28 is further specifically configured to establish at least one second tunnel according to the identifier of the UE, the second tunnel identifier, and the at least one second tunnel type identifier that are received by the receiver 27.

Optionally, the second instruction information received by the receiver 27 further includes at least one bearer identifier corresponding to the UE, and each bearer identifier is corresponding to the at least one second tunnel type identifier; and the processor 28 is further specifically configured to establish the at least one second tunnel according to the identifier of the UE, the second tunnel identifier, the at least one second tunnel type identifier, and the at least one bearer identifier that are received by the receiver 27.

Optionally, the second interface established by the processor 28 includes the m first tunnels corresponding to the first tunnel type identifier received by the receiver 27; and the transmitter 26 is specifically configured to send the measurement information to the control node by using each first tunnel in the m first tunnels established by the processor 28.

Optionally, a frame format of a data packet transmitted in each first tunnel established by the processor 28 includes a frame header part and a data part; and the transmitter 26 is further specifically configured to send the data packet to the control node by using each first tunnel established by the processor 28, where the data part in the data packet carries the measurement information.

Optionally, the second interface established by the processor 28 further includes the at least one second tunnel in a one-to-one correspondence with the at least one second tunnel type identifier received by the receiver 27;

the receiver 27 is further configured to: after the processor 28 establishes the second interface according to the second instruction information, receive, by using each second tunnel in the at least one second tunnel established by the processor 28, a protocol data unit PDU data packet sent by the control node; and the transmitter 26 is further configured to send the PDU data packet received by the receiver 27 to the UE, where the PDU data packet is corresponding to any tunnel type identifier in the at least one second tunnel type identifier.

Optionally, the receiver 27 is specifically configured to receive, by using each second tunnel in the at least one second tunnel, the PDU data packet and at least one bearer identifier corresponding to the PDU data packet that are sent by the control node.

The transmitter 26 is further specifically configured to send the PDU data packet and the at least one bearer identifier that are received by the receiver 27 to a first entity of the UE, where the first entity is a protocol layer entity corresponding to the PDU data packet.

Optionally, the receiver 27 is further configured to: before the transmitter 26 sends the measurement information to the control node by using the second interface established by the processor 28, receive an enabling message sent by the control node, where the enabling message is used to enable the measurement information to be reported by using the second interface.

Optionally, the second tunnel type identifier received by the receiver 27 includes a Packet Data Convergence Protocol PDCP protocol data unit PDU, a Radio Link Control RLC PDU, and a Media Access Control MAC PDU.

Optionally, the first instruction information received by the receiver 27 is carried in a first request message, and the first request message further carries at least one of measurement parameter information, measurement feedback time information, UE quantity feedback information, or the identifiers of the m cells; and the receiver 27 is further configured to: after the processor 28 establishes the first interface according to the first instruction information, receive the at least one, which is sent by the control node, of the measurement parameter information, the measurement feedback time information, the UE quantity feedback information, and the identifies of the m cells.

The processor 28 is further configured to perform configuration on the established first interface according to the at least one, which is received by the receiver 27, of the measurement parameter information, the measurement feedback time information, the UE quantity feedback information, or the identifiers of the m cells.

Optionally, the resource configuration information received by the receiver 27 includes at least one of time domain information of a resource, frequency domain information of the resource, space domain information of the resource, code domain information of the resource, transmit power information of the resource, or information about a time at which resource configuration may be performed; and the processor 28 is further specifically configured to perform configuration according to the at least one, which is received by the receiver 27, of the time domain information of the resource in the m cells, the frequency domain information of the resource in the m cells, the space domain information of the resource in the m cells, the code domain information of the resource in the m cells, the transmit power information of the resource in the m cells, and the information about the time at which resource configuration may be performed in the m cells.

Optionally, the receiver 27 is further configured to: after configuration is performed according to the resource configuration information of the m cells, receive at least one cell identifier in the identifiers of the m cells and stop instruction information that are sent by the control node, where the stop instruction information is used to instruct to stop reporting measurement information of a cell.

The processor 28 is further configured to stop, according to the at least one cell identifier and the stop instruction information that are received by the receiver 27, reporting measurement information of at least one cell corresponding to the at least one cell identifier.

The transmitter 26 is further configured to send a first reply confirmation message to the control node, so that the control node stops, according to the first reply confirmation message, receiving the measurement information of the at least one cell.

Optionally, the receiver 27 is further configured to: after configuration is performed according to the resource configuration information of the m cells, receive at least one cell identifier in the identifiers of the m cells and release instruction information that are sent by the control node, where the release instruction information is used to instruct to stop measuring a cell and reporting measurement information of the cell.

The processor 28 is further configured to stop, according to the at least one cell identifier and the release instruction information that are received by the receiver 27, measuring at least one cell corresponding to the at least one cell identifier and reporting measurement information of the at least one cell.

The transmitter 26 is further configured to send a second reply confirmation message to the control node, so that the control node stops, according to the second reply confirmation message, receiving the measurement information of the at least one cell.

Optionally, an underlying bearer of the first interface established by the processor 28 is SCTP, and an underlying bearer of the second interface established by the processor 28 is UDP.

This embodiment of the present disclosure provides a first base station. The first base station receives first instruction information and second instruction information that are sent by a control node, where the first instruction information is used to instruct to establish a first interface, and the second instruction information is used to instruct to establish a second interface. The first base station establishes the first interface according to the first instruction information, and establishes the second interface according to the second instruction information. The first base station sends measurement information to the control node by using the second interface, so that the control node determines resource configuration information of m cells according to the measurement information, where the measurement information is measurement results of the m cells, and the m cells are cells in a coordinated communication set, and m≥1. Then, the first base station receives, by using the first interface, the resource configuration information of the m cells that is sent by the control node. Finally, the first base station performs configuration according to the resource configuration information of the m cells. In the solution, the first base station sends the measurement information by using the second interface, that is, a user plane interface, so that the measurement information is transmitted more quickly, and the first base station receives the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

Embodiment 3

Figure 13:
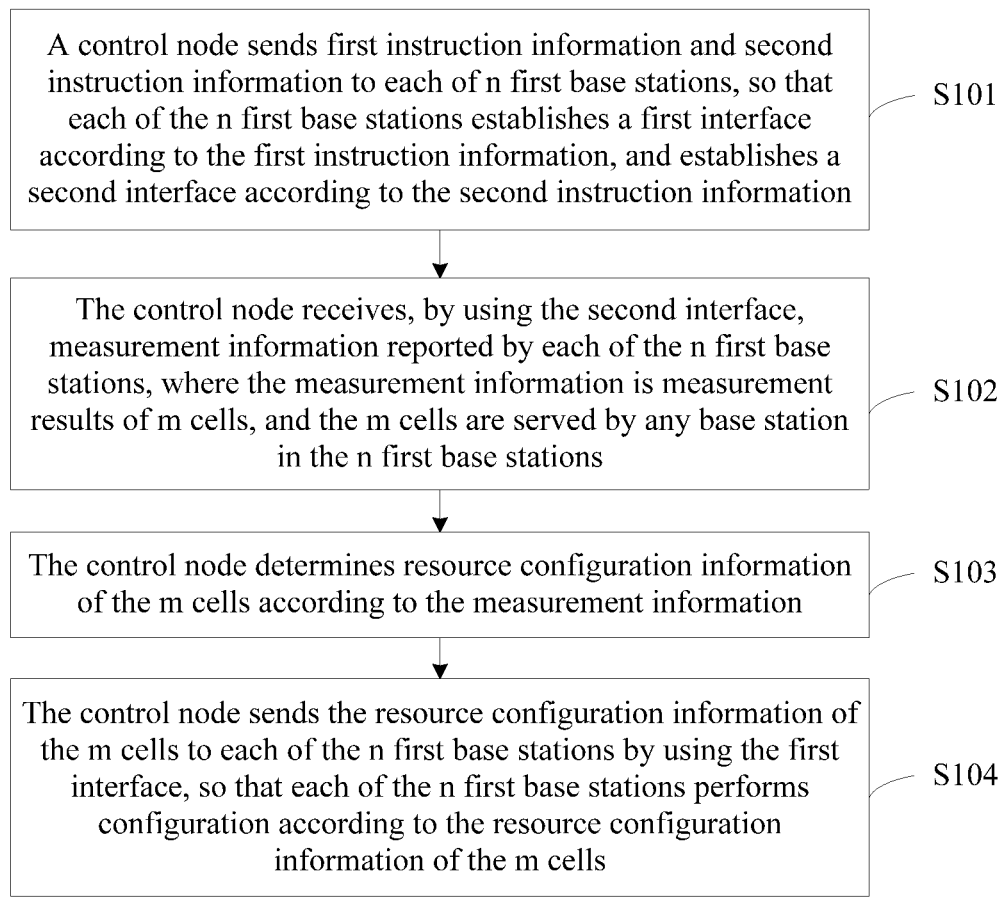
FIG. 13 is a flowchart 1 of a coordinated communication method according to an embodiment of the present disclosure.

This embodiment of the present disclosure provides a coordinated communication method. As shown in FIG. 13, the method is a coordinated communication method on a control node side, and the method may include the following steps:

S101. A control node sends first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1.

The coordinated communication method provided in this embodiment of the present disclosure is implemented on the basis of an inter-base-station coordination technology. The control node is a node that coordinates measurement feedback information and resource configuration information between base stations.

Optionally, the control node may be deployed in a base station, or may be deployed in OAM, or may be deployed in an independent communication node.

The control node sends the first instruction information to each of the n first base stations, so that the n first base stations establish the first interface according to the first instruction information, where the first instruction information is used to instruct the n first base stations to establish the first interface. The control node sends the second instruction information to each of the n first base stations, so that the n first base stations establish the second interface according to the second instruction information, where the second instruction information is used to instruct the n first base stations to establish the second interface, and n≥1.

Specifically, the control node sends a first request message to the n first base stations, so that the n first base stations acquire the first instruction information from the first request message, and establish the first interface according to the first instruction information, where the first request message carries the first instruction information, and the first instruction information is used to instruct the n first base stations to establish the first interface. The control node sends a second request message to the n first base stations, so that the n first base stations acquire the second instruction information from the second request message, and establish the second interface according to the second instruction information, where the second request message carries the second instruction information, and the second instruction information is used to instruct the n first base stations to establish the second interface.

Optionally, the first interface may be an X2 interface.

Optionally, the second interface may be an X2 interface.

X2 may implement interconnection between base stations, that is, the X2 is an interface between the base stations.

Specifically, because X2 may be classified into a user plane and a control plane, a user plane interface in X2 interfaces provides a function of user data transmission between base stations, and a control plane interface in X2 interfaces provides a function of signaling transmission between the base stations.

It should be noted that in this embodiment of the present disclosure, the first interface may be a control plane interface in X2 interfaces, so that the control node can perform signaling interaction with the n first base stations by using the first interface, or the first interface may be a newly established interface that may implement a function of signaling interaction between the control node and the n first base stations; the second interface may be a user plane interface in X2 interfaces, so that the control node can perform data transmission with the n first base stations by using the second interface, or the second interface may be a newly established interface that may implement a function of data transmission between the control node and the n first base stations. The present disclosure does not impose a limitation on details.

An underlying bearer of the first interface is SCTP, and an underlying bearer of the second interface is UDP.

Further, after the control node sends the first request message to the n first base stations, the control node receives a first request response message sent by the n first base stations, where the first request response message is used to indicate that each of the n first base stations completes establishment of the first interface. After the control node sends the second request message to the n first base stations, the control node receives a second request response message sent by the n first base stations, where the second request response message is used to indicate that each of the n first base stations completes establishment of the second interface.

It should be noted that the first base station in this embodiment of the present disclosure is any base station in a base station set that is determined by the control node and that may participate in inter-base-station coordination, that is, in the coordinated communication set.

Specifically, the control node determines a cell set or a cell list that may participate in the coordination, that is, cells in the coordinated communication set, and determines the base station set in the coordinated communication set by using the cell set. A detailed method for determining the coordinated communication set by the control node is described in detail in a subsequent embodiment.

S102. The control node receives, by using the second interface, measurement information reported by each of the n first base stations, where the measurement information is measurement results of m cells, and the m cells are served by any base station in the n first base stations, and m≥1.

After the control node sends the first instruction information and the second instruction information to each of the n first base stations, the control node receives, by using the second interface, the measurement information reported by each of the n first base stations, where the measurement information is measurement results that are reported by UE to the n first base stations, or the measurement information is measurement results from the n first base stations, the measurement results are results of measurement performed by the UE or the n first base stations on the m cells, and the m cells are served by any base station in the n first base stations, and m≥1.

Specifically, after the control node sends the first instruction information and the second instruction information to the n first base stations, the control node receives, by using the second interface, a resource status request message sent by each of the n first base stations, where the resource status request message carries the measurement information, the resource status request message is used to request the control node to perform resource coordination and configuration, and the measurement information may be the measurement results reported by the UE to the n first base stations, or may be the measurement results from the n first base stations, where the measurement results are the results of measurement performed by the UE or the n first base stations on the m cells, and the m cells are served by any base station in the n first base stations.

It should be noted that the UE may perform measurement on a serving cell of the UE, or may perform measurement on a neighboring cell of a serving cell of the UE, and report a measurement result to a base station to which the serving cell of the UE belongs. The base station may also perform measurement on a served cell, and acquire a measurement result of the cell served by the base station. In this embodiment of the present disclosure, for the measurement result of the cell served by the base station, only a result of measurement performed by the base station on a cell in the coordinated communication set is needed; therefore, the foregoing base station is a first base station.

Further, in this embodiment of the present disclosure, the UE is a user terminal that may communicate with a base station in the coordinated communication set. A cell on which the UE may perform measurement may fall within the cell set, that is, the coordinated communication set, provided in this embodiment of the present disclosure, or may fall beyond the cell set provided in this embodiment of the present disclosure. When the base station that communicates with the UE falls within the coordinated communication set, the UE filters out a measurement result of a cell that falls beyond the cell set, and reports a measurement result of a cell in the cell set to the base station, that is, the first base station. Alternatively, when the base station that communicates with the UE falls within the coordinated communication set, the UE performs filtering on a cell on which the UE may perform measurement, filters out a cell that falls beyond the cell set, performs measurement on a cell in the cell set, and finally reports the measurement result to the base station, that is, the first base station.

It should be noted that in this embodiment of the present disclosure, a measurement result that is reported by the UE and received by each first base station is a measurement result performed by the UE on a cell in the cell set.

It may be understood that the control node needs to receive, in a timely manner, the measurement information reported by each of the n first base stations, so that resource coordination and configuration can be efficiently performed, according to the measurement information, on cells corresponding to the measurement information. The second interface is a user plane interface, an underlying bearer of the user plane interface is UDP, and unreliable transmission implemented by using the UDP can reduce an information transmission delay; therefore, receiving, by the control node by using the second interface, the measurement information reported by each of the n first base stations reduces a transmission delay in the inter-base-station coordinated communication, and improves performance of the inter-base-station coordinated communication.

S103. The control node determines resource configuration information of the m cells according to the measurement information.

After the control node receives, by using the second interface, the measurement information reported by each of the n first base stations, the control node determines the resource configuration information of the m cells according to the measurement information, where the m cells are served by any base station in the n first base stations.

It may be understood that the control node determines, according to the measurement information, a manner in which resources are used in the m cells, that is, the resource configuration information.

It should be noted that, because one first base station may serve multiple cells, the m cells may belong to one first base station, or may belong to multiple first base stations, that is, the m cells are served by any base station in the n first base stations.

S104. The control node sends the resource configuration information of the m cells to each of the n first base stations by using the first interface, so that each of the n first base stations performs configuration according to the resource configuration information of the m cells.

After the control node determines the resource configuration information of the m cells according to the measurement information, the control node sends the resource configuration information of the m cells to each of the n first base stations by using the first interface, so that each of the n first base stations performs configuration according to the resource configuration information of the m cells.

Specifically, the control node sends an information loading message to each of the n first base stations by using the first interface, so that the n first base stations acquire the resource configuration information of the m cells from the information loading message, so that each of the n first base stations performs configuration according to the resource configuration information of the m cells.

It may be understood that the control node needs to completely send the resource configuration information of the m cells to the n first base stations, so that the n first base stations efficiently use resources according to the resource configuration information, and a purpose of coordinated communication is achieved. The first interface is a control plane interface, an underlying bearer of the control plane interface is SCTP, and reliable transmission implemented by using the SCTP can ensure completeness of transmitted information; therefore, sending the resource configuration information of the m cells by the control node by using the first interface improves performance of the inter-base-station coordinated communication when reliability of the inter-base-station coordinated communication is ensured.

It should be noted that S104 may be an optional step. If the control node is deployed in the first base station, the control node may receive the measurement information of the m cells by using the established second interface, and determine the resource configuration information of the m cells according to the measurement information, and the first base station in which the control node is located only needs to learn the resource configuration information of the m cells. Therefore, S104 may be an optional step.

Figure 14:
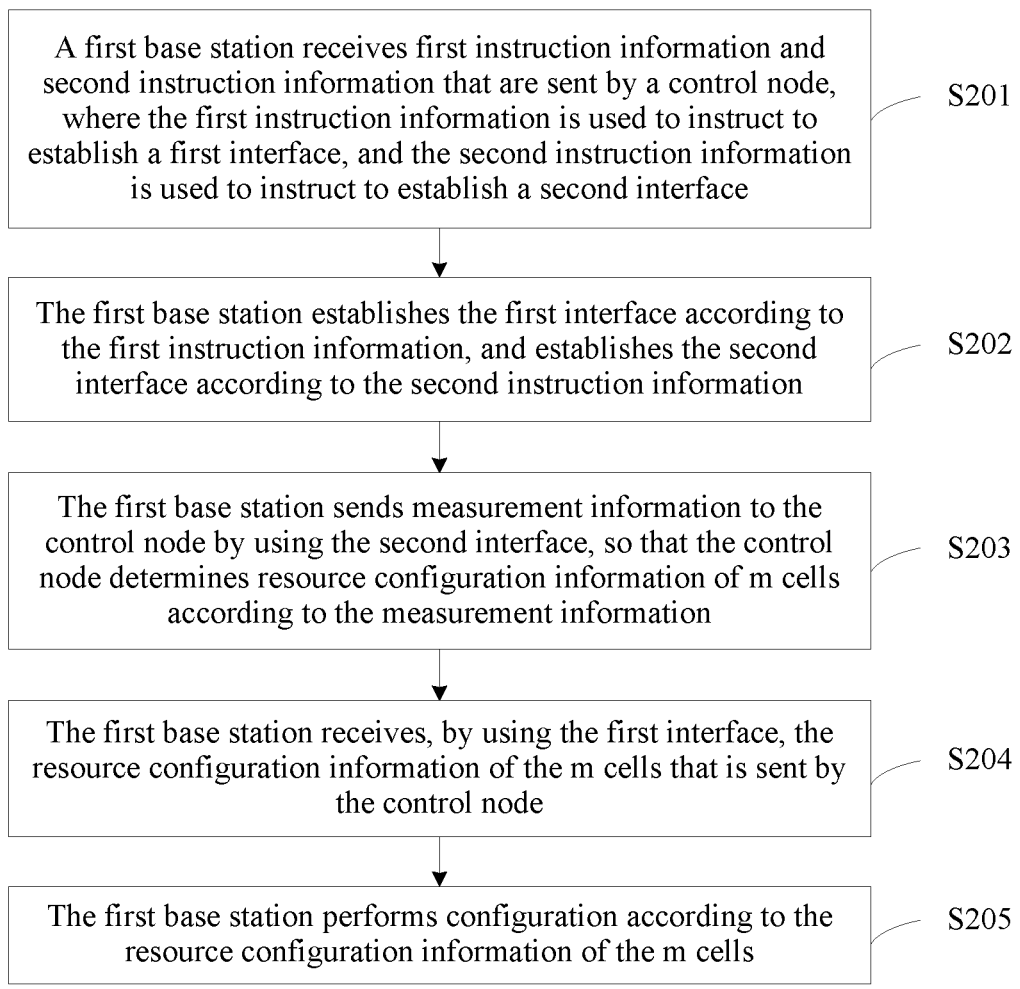
FIG. 14 is a flowchart 2 of a coordinated communication method further according to an embodiment of the present disclosure.

This embodiment of the present disclosure further provides a coordinated communication method. As shown in FIG. 14, the method is a coordinated communication method on a base station side, and the method may include the following steps:

S201. A first base station receives first instruction information and second instruction information that are sent by a control node, where the first instruction information is used to instruct to establish a first interface, the second instruction information is used to instruct to establish a second interface, and the first base station is a base station in a coordinated communication set.

The coordinated communication method provided in this embodiment of the present disclosure is implemented on the basis of an inter-base-station coordination technology.

It should be noted that the first base station in this embodiment of the present disclosure is any base station in a base station set that is acquired by the control node and that may participate in inter-base-station coordination, that is, in the coordinated communication set.

Specifically, the control node acquires a cell set or a cell list that may participate in the coordination, that is, cells in the coordinated communication set, and determines the base station set, that is, a set of first base stations, in the coordinated communication set by using the cell set.

The first base station receives the first instruction information and the second instruction information that are sent by the control node, where the first instruction information is used to instruct to establish the first interface, the second instruction information is used to instruct to establish the second interface, and the first base station is a base station in the coordinated communication set.

Specifically, the first base station receives a first request message sent by the control node, and the first base station acquires the first instruction information from the first request message, where the first request message carries the first instruction information, and the first instruction information is used to instruct the first base station to establish the first interface. The first base station receives a second request message sent by the control node, and the first base station acquires the second instruction information from the second request message, where the second request message carries the second instruction information, and the second instruction information is used to instruct the first base station to establish the second interface.

S202. The first base station establishes the first interface according to the first instruction information, and establishes the second interface according to the second instruction information.

After the first base station receives the first instruction information and the second instruction information that are sent by the control node, the first base station establishes the first interface according to the first instruction information.

Optionally, the first interface may be an X2 interface, and the second interface may also be an X2 interface.

It should be noted that in this embodiment of the present disclosure, the first interface may be a control plane interface in X2 interfaces, so that the control node can perform signaling interaction with n first base stations by using the first interface, or the first interface may be a newly established interface that may implement a function of signaling interaction between the control node and n first base stations; the second interface may be a user plane interface in X2 interfaces, so that the control node can perform data transmission with the n first base stations by using the second interface, or the second interface may be a newly established interface that may implement a function of data transmission between the control node and the n first base stations. The present disclosure does not impose a limitation on details.

An underlying bearer of the first interface is SCTP, and an underlying bearer of the second interface is UDP.

Further, after the first base station establishes the first interface according to the first instruction information, the first base station sends a first request response message to the control node, so that the control node learns that the first base station completes establishment of the first interface, where the first request response message is used to indicate that the first base station completes establishment of the first interface. After the first base station receives the second request message sent by the control node, the first base station sends a second request response message to the control node, so that the control node learns that the first base station completes establishment of the second interface, where the second request response message is used to indicate that the first base station completes establishment of the second interface.

S203. The first base station sends measurement information to the control node by using the second interface, so that the control node determines resource configuration information of m cells according to the measurement information, where the measurement information is measurement results of the m cells, and the m cells are cells in the coordinated communication set, and m≥1.

After the first base station establishes the first interface according to the first instruction information, and establishes the second interface according to the second instruction information, and the first base station establishes the second interface according to the second instruction information, the first base station sends the measurement information to the control node by using the second interface, so that the control node determines the resource configuration information of the m cells according to the measurement information, where the measurement information is the measurement results of the m cells, and the m cells are cells in the cell set determined by the control node, that is, cells in the coordinated communication set, and m≥1.

It should be noted that UE may perform measurement on a serving cell of the UE, or may perform measurement on a neighboring cell of a serving cell of the UE, and report a measurement result to a base station to which the serving cell of the UE belongs. The base station may also perform measurement on a served cell, and acquire a measurement result of the cell served by the base station. In this embodiment of the present disclosure, the measurement results of the m cells may be a result of measurement performed by the first base station on a cell in the cell set, or may be a measurement result of measurement performed by the UE on a cell that falls beyond the cell set.

It should be noted that in this embodiment of the present disclosure, a measurement result that is reported by the UE and received by each first base station is a measurement result of measurement performed by the UE on a cell in the cell set.

It may be understood that the first base station needs to report the measurement information to the control node in a timely manner, so that the control node can efficiently perform, according to the measurement information, resource configuration for the m cells corresponding to the measurement information. The second interface is a user plane interface, an underlying bearer of the user plane interface is UDP, and unreliable transmission implemented by using the UDP can reduce an information transmission delay; therefore, reporting the measurement information of the m cells by the first base station by using the second interface reduces a transmission delay in the inter-base-station coordinated communication, and improves performance of the inter-base-station coordinated communication.

It should be noted that, because one first base station may serve multiple cells, the m cells may belong to one first base station, or may belong to multiple first base stations, that is, the m cells may be served by any base station in the n first base stations.

S204. The first base station receives, by using the first interface, the resource configuration information of the m cells that is sent by the control node.

After the first base station sends the measurement information to the control node by using the second interface, the first base station receives, by using the first interface, the resource configuration information of the m cells that is sent by the control node.

It may be understood that the first base station receives, by using the first interface, the resource configuration information of the m cells that is sent by the control node, and because of reliability of transmission by using the first interface, transmission completeness of the resource configuration information received by the first base station can be ensured, and a purpose of coordinated communication is achieved.

S205. The first base station performs configuration according to the resource configuration information of the m cells.

After the first base station receives, by using the first interface, the resource configuration information of the m cells that is sent by the control node, the first base station performs configuration according to the resource configuration information of the m cells.

Specifically, the first base station may perform resource configuration or resource coordination according to the resource configuration information of the m cells, and then communicate with the UE.

It should be noted that S204 may be an optional step. If the control node is deployed in the first base station, the control node may receive the measurement information of the m cells by using the established second interface, and determine the resource configuration information of the m cells according to the measurement information, and the first base station in which the control node is located only needs to learn the resource configuration information of the m cells. Therefore, S204 may be an optional step.

In the coordinated communication method provided in this embodiment of the present disclosure, a control node sends first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1; the control node receives, by using the second interface, measurement information reported by each of the n first base stations, where the measurement information is measurement results of m cells, and the m cells are served by any one of the n first base stations, and m≥1; the control node determines resource configuration information of the m cells according to the measurement information; and finally, the control node sends the resource configuration information of the m cells to each of the n first base stations by using the first interface, so that each of the n first base stations performs configuration according to the resource configuration information of the m cells. In the solution, the control node receives the measurement information by using the second interface, that is, a user plane interface, so that the measurement information is transmitted more quickly, and the control node sends the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

Embodiment 4

Figure 15A:
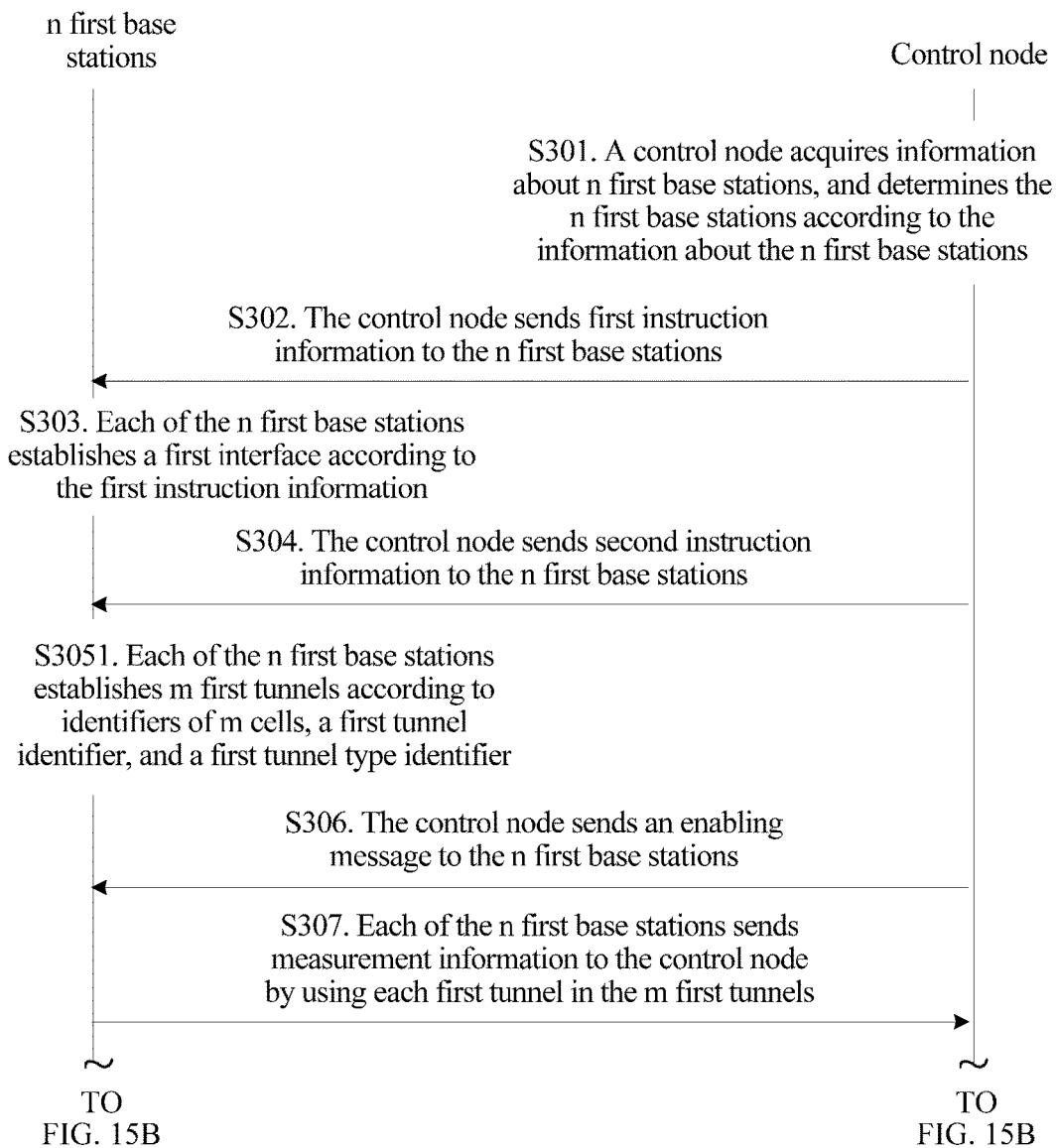
FIG. 15A and FIG. 15B each is an interaction diagram 1 of a coordinated communication method according to an embodiment of the present disclosure.
Figure 15B:
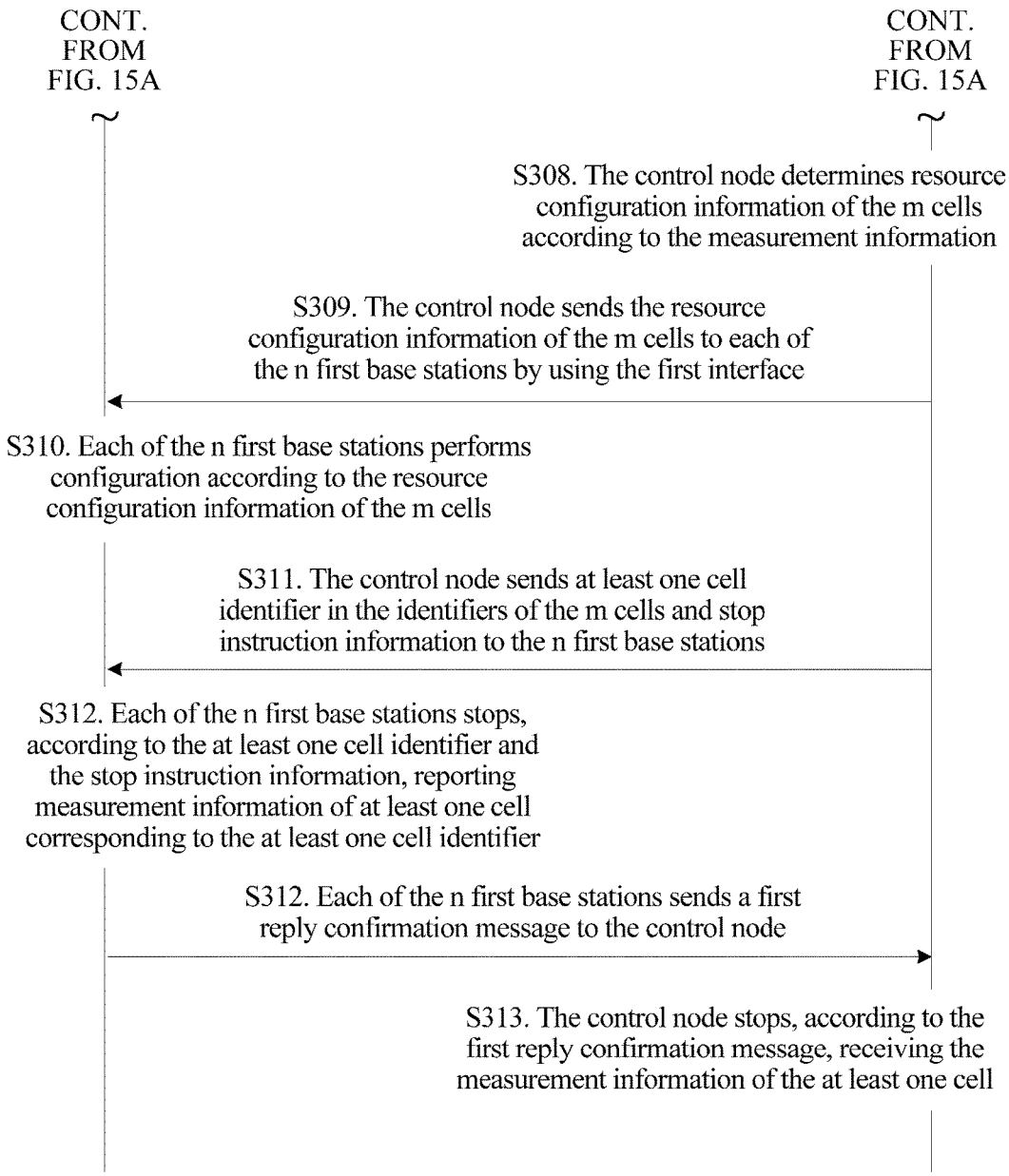

This embodiment of the present disclosure provides a coordinated communication method. As shown in FIG. 15, the method may include the following steps:

S301. A control node acquires information about n first base stations, and determines the n first base stations according to the information about the n first base stations, where the n first base stations are base stations in a coordinated communication set.

The coordinated communication method provided in this embodiment of the present disclosure is implemented on the basis of an inter-base-station coordination technology. The control node is a node that coordinates measurement feedback information and resource configuration information between base stations.

Optionally, the control node may be deployed in a base station, or may be deployed in OAM, or may be deployed in an independent communication node.

When coordinated communication is being performed between base stations, the control node first needs to determine the n first base stations, that is, a base station set in the coordinated communication set.

It should be noted that the first base station in this embodiment of the present disclosure is any base station in the base station set that is determined by the control node and that may participate in inter-base-station coordination, that is, in the coordinated communication set.

Specifically, the control node acquires a cell set or a cell list that may participate in the coordination, that is, cells in the coordinated communication set, and determines the base station set, that is, a set of first base stations, in the coordinated communication set by using the cell set.

Further, that a control node acquires information about n first base stations, and determines the n first base stations according to the information about the n first base stations may be as follows:

(1). OAM configures a coordinated communication set for the control node; or (2). the control node and a base station determine a coordinated communication set by means of negotiation; or (3). the control node determines that neighboring base stations centered around a base station are a coordinated communication set; or (4). the control node determines a coordinated communication set according to measurement information of UE.

For example, the control node uses a base station 1 as a center, acquires information about neighboring base stations of the base station 1, and determines, according to the information about the neighboring base stations of the base station 1, that a base station 2, a base station 3, a base station 4, and the like that neighbors the base station 1 are a coordinated communication set.

S302. The control node sends first instruction information to the n first base stations, where the first instruction information is used to instruct the n first base stations to establish a first interface.

In this embodiment of the present disclosure, after the control node determines the n first base stations, the control node sends the first instruction information to the n first base stations, where the first instruction information is used to instruct the n first base stations to establish the first interface.

Specifically, the control node sends a first request message to the n first base stations, where the first request message carries the first instruction information, and the first instruction information is used to instruct the n first base stations to establish the first interface.

Further, when the control node sends the first request message to the n first base stations, the first request message may further carry at least one of measurement parameter information, measurement feedback time information, UE quantity feedback information, and identifiers of m cells.

Specifically, the n first base stations acquire, from the first request message, the at least one, which is sent by the control node, of the measurement parameter information, the measurement feedback time information, the UE quantity feedback information, or the identifiers of the m cells.

S303. Each of the n first base stations establishes the first interface according to the first instruction information.

After the control node sends the first instruction information to the n first base stations, each of the n first base stations establishes the first interface according to the first instruction information.

Specifically, each of the n first base stations acquires the first instruction information from the first request message sent by the control node, and establishes the first interface according to the first instruction information.

It should be noted that, because the control node performs coordination between the n first base stations, each of the n first base stations establishes the first interface according to the first instruction information, where the first interface is an interface for communication between the control node and the first base station.

Optionally, the first interface may be an X2 interface.

X2 may implement interconnection between base stations, that is, the X2 is an interface between the base stations.

Specifically, because X2 may be classified into a user plane and a control plane, a user plane interface in X2 interfaces provides a function of user data transmission between base stations, and a control plane interface in X2 interfaces provides a function of signaling transmission between the base stations.

It should be noted that in this embodiment of the present disclosure, the first interface may be a control plane interface in X2 interfaces, so that the control node can perform signaling interaction with the n first base stations by using the first interface, or the first interface may be a newly established interface that may implement a function of signaling interaction between the control node and the n first base stations, which is not limited in the present disclosure.

Further, when the control node sends the first request message to the n first base stations, the first request message may further carry the at least one of the measurement parameter information, the measurement feedback time information, the UE quantity feedback information, or the identifiers of the m cells; therefore, the n first base stations may perform configuration on the first interface according to the at least one of the measurement parameter information, the measurement feedback time information, the UE quantity feedback information, or the identifiers of the m cells.

It should be noted that the identifiers of the m cells are corresponding to the m cells, and each of the m cells is any cell in the cell set in this embodiment of the present disclosure.

Optionally, the measurement parameter information may include CQI (channel quality indicator) measurement, RRM (radio resource management) measurement, SRS (sounding reference signal) measurement, and the like.

For example, if a base station 1 receives the CQI measurement sent by the control node, the base station 1 sends a CQI measurement result of a first cell to the control node by using a first tunnel 1. The first tunnel 1 is corresponding to the first cell, measurement information of the first cell is transmitted in the first tunnel 1, the first cell belongs to the first base station 1, and the first base station 1 is any base station in the coordinated communication set.

It may be understood that, because the first request message may include the identifiers of the m cells, the control node may send, according to the identifiers of the m cells, the first instruction information to the n first base stations to which the m cells corresponding to the identifiers of the m cells belong.

Further, after each of the n first base stations establishes the first interface according to the first instruction information, the control node receives a first request response message sent by the n first base stations, where the first request response message is used to indicate that each of the n first base stations completes establishment of the first interface.

S304. The control node sends second instruction information to the n first base stations, where the second instruction information is used to instruct the n first base stations to establish a second interface, and the second instruction information includes identifiers of m cells and a first tunnel identifier and a first tunnel type identifier that are corresponding to the identifiers of the m cells.

After each of the n first base stations establishes the first interface according to the first instruction information, the control node sends the second instruction information to the n first base stations, where the second instruction information is used to instruct the n first base stations to establish the second interface, the second instruction information includes the identifiers of the m cells, the first tunnel identifier, and the first tunnel type identifier, the identifiers of the m cells are in a one-to-one correspondence with the first tunnel identifier, or the identifiers of the m cells are in a one-to-one correspondence with the first tunnel type identifier.

Specifically, the control node sends a second request message to the n first base stations, where the second request message carries the second instruction information, the second instruction information is used to instruct the n first base stations to establish the second interface, the second instruction information includes the identifiers of the m cells, the first tunnel identifier, and the first tunnel type identifier, the identifiers of the m cells are in a one-to-one correspondence with the first tunnel identifier, or the identifiers of the m cells are in a one-to-one correspondence with the first tunnel type identifier.

Optionally, in this embodiment of the present disclosure, the second interface may be a user plane interface in X2 interfaces, so that the control node can perform data transmission with the n first base stations by using the second interface, or the second interface may be a newly established interface that may implement a function of data transmission between the control node and the n first base stations, which is not limited in the present disclosure.

It should be noted that the first tunnel type identifier is used to indicate a type of data that may be transmitted in a first tunnel.

It should be noted that there are two types of first tunnel type identifiers: an explicit type and an implicit type. An explicit indicator is data content that may be specifically transmitted, and an implicit indicator is a type tag of data that may be specifically transmitted.

In this embodiment of the present disclosure, the first tunnel type identifier is used to indicate a tunnel for transmitting measurement information.

Further, the second instruction information further includes an identifier of the UE, at least one second tunnel identifier corresponding to the identifier of the UE, and a second tunnel identifier and at least one second tunnel type identifier that are corresponding to the identifier of the UE.

It should be noted that in this embodiment of the present disclosure, the second tunnel identifier and the first tunnel identifier may be same identifiers. The second tunnel type identifier is used to indicate a type of transmitted data.

Optionally, the second tunnel type identifier may include a PDCP (Packet Data Convergence Protocol) PDU, an RLC (Radio Link Control) PDU, and a MAC (Media Access Control) PDU.

Further, the second instruction information may further include at least one bearer identifier corresponding to the UE, and each bearer identifier is corresponding to the at least one second tunnel type identifier, that is, one bearer identifier may be corresponding to three different types of second tunnel identifiers.

S3051. Each of the n first base stations establishes m first tunnels according to the identifiers of the m cells, the first tunnel identifier, and the first tunnel type identifier.

After the control node sends the second instruction information to the n first base stations, each of the n first base stations establishes the first tunnel according to the identifiers of the m cells, the first tunnel identifier, and the first tunnel type identifier, so as to complete establishment of the second interface.

It should be noted that the identifiers of the m cells are in a one-to-one correspondence with the first tunnel identifier, that is, one first tunnel identifier may be configured for one cell identifier, one first tunnel identifier is in a one-to-one correspondence with one first tunnel type identifier, and there may be one or more first base stations to which the m cells belong. A specific correspondence between the m cells and the first base stations may be determined according to an actual case. One first base station may establish one first tunnel according to one cell identifier, one first tunnel identifier corresponding to the cell, and one first tunnel type identifier corresponding to the first tunnel identifier.

Further, in this embodiment of the present disclosure, measurement information of one cell is transmitted in one first tunnel. The cell may be any one of the m cells corresponding to the identifiers of the m cells.

In particular, in this embodiment of the present disclosure, the first tunnel may be a tunnel based on GTP (GPRS tunneling protocol).

S306. The control node sends an enabling message to the n first base stations, where the enabling message is used to enable each of the n first base stations to report measurement information by using each first tunnel in the m first tunnels, and the measurement information is measurement results of the m cells.

After each of the n first base stations establishes the m first tunnels according to the identifiers of the m cells, the first tunnel identifier, and the first tunnel type identifier, the control node sends the enabling message to the n first base stations, where the enabling message is used to enable the n first base stations to report the measurement information by using each first tunnel in the m first tunnels, the measurement information is the measurement results of the m cells, and the m cells are served by any base station in the n first base stations, that is, the m cells are m cells in the cell set.

It should be noted that in this embodiment of the present disclosure, after each of the n first base stations establishes the m first tunnels according to the identifiers of the m cells, the first tunnel identifier, and the first tunnel type identifier, the n first base stations may directly enable, by default, the measurement information to be reported by using each first tunnel in the m first tunnels. For a specific manner of enabling reporting of the measurement information, corresponding processing may be performed according to an actual case.

S307. Each of the n first base stations sends the measurement information to the control node by using each first tunnel in the m first tunnels.

After the control node sends the enabling message to the n first base stations, each of the n first base stations sends the measurement information to the control node by using each first tunnel in the m first tunnels, where the measurement information is measurement results of the m cells.

Specifically, each of the n first base stations sends the data packet by using each first tunnel in the m first tunnels, where a data part in the data packet carries the measurement information, and a frame format of the data packet transmitted in the first tunnel includes a header and the data part.

It should be noted that the UE may perform measurement on a serving cell of the UE, or may perform measurement on a neighboring cell of a serving cell of the UE, and report a measurement result to a base station to which the serving cell of the UE belongs. The base station may also perform measurement on a served cell, and acquire a measurement result of the cell served by the base station. In this embodiment of the present disclosure, for the measurement result of the cell served by the base station, only a result of measurement performed by the base station on a cell in the cell set is needed; therefore, the base station is a first base station.

Further, in this embodiment of the present disclosure, the UE is a user terminal that may communicate with a base station in the coordinated communication set. A cell on which the UE may perform measurement may fall within the cell set, that is, the coordinated communication set, provided in this embodiment of the present disclosure, or may fall beyond the cell set provided in this embodiment of the present disclosure. When the base station that communicates with the UE falls within the coordinated communication set, the UE filters out a measurement result of a cell that falls beyond the cell set, and reports a measurement result of a cell in the cell set to the base station, that is, the first base station. Alternatively, when the base station that communicates with the UE falls within the coordinated communication set, the UE performs filtering on a cell on which the UE may perform measurement, filters out a cell that falls beyond the cell set, performs measurement on a cell in the cell set, and finally reports the measurement result to the base station, that is, the first base station.

It should be noted that in this embodiment of the present disclosure, a measurement result that is reported by the UE and received by each first base station is a measurement result of measurement performed by the UE on a cell in the cell set.

It may be understood that each of the n first base stations needs to report the measurement information to the control node in a timely manner, so that the control node can efficiently perform, according to the measurement information, resource configuration for the m cells corresponding to the measurement information. The m first tunnels are user plane interfaces, an underlying bearer of the user plane interface is UDP, and unreliable transmission implemented by using the UDP can reduce an information transmission delay; therefore, reporting the measurement information of the m cells by the n first base stations by using the m first tunnels reduces a transmission delay in the inter-base-station coordinated communication, and improves performance of the inter-base-station coordinated communication.

It should be noted that the n first base stations may perform configuration on the first interface according to the at least one of the measurement parameter information, the measurement feedback time information, the UE quantity feedback information, or the identifiers of the m cells; therefore, the first base station performs measurement on the m cells according to the at least one of the measurement parameter information, the measurement feedback time information, the UE quantity feedback information, or the identifiers of the m cells. For example, the first base station may measure the m cells according to the measurement parameter information, may also send the measurement information according to the measurement feedback time information, and the like. Finally, each of the n first base stations sends, to the control node by using each first tunnel in the m first tunnels, the measurement information obtained after measurement of the m cells.

S308. The control node determines resource configuration information of the m cells according to the measurement information.

After each of the n first base stations sends the measurement information to the control node by using the m first tunnels, the control node determines the resource configuration information of the m cells according to the measurement information.

It may be understood that the control node determines, according to the measurement information, a manner in which resources are used in the m cells, that is, the resource configuration information.

It should be noted that, because one first base station may serve multiple cells, the m cells may belong to one first base station, or may belong to multiple first base stations, that is, the m cells are served by any base station in the n first base stations.

Further, the resource configuration information may include at least one of time domain information of a resource, frequency domain information of the resource, space domain information of the resource, code domain information of the resource, transmit power information of the resource, or information about a time at which resource configuration may be performed.

S309. The control node sends the resource configuration information of the m cells to each of the n first base stations by using the first interface.

After the control node determines the resource configuration information of the m cells according to the measurement information, the control node sends the resource configuration information of the m cells to each of the n first base stations by using the first interface, so that each of the n first base stations performs configuration according to the resource configuration information of the m cells.

Specifically, the control node sends an information loading message to each of the n first base stations by using the first interface, so that the n first base stations acquire the resource configuration information of the m cells from the information loading message, so that each of the n first base stations performs configuration according to the resource configuration information of the m cells.

It may be understood that the control node needs to completely send the resource configuration information of the m cells to the n first base stations, so that the n first base stations efficiently use resources according to the resource configuration information, and a purpose of coordinated communication is achieved. The first interface is a control plane interface, an underlying bearer of the control plane interface is SCTP, and reliable transmission implemented by using the SCTP can ensure completeness of transmitted information; therefore, sending the resource configuration information of the m cells by the control node by using the first interface improves performance of the inter-base-station coordinated communication when reliability of the inter-base-station coordinated communication is ensured.

S310. Each of the n first base stations performs configuration according to the resource configuration information of the m cells.

After the control node sends the resource configuration information of the m cells to each of the n first base stations by using the first interface, each of the n first base stations performs configuration according to the resource configuration information of the m cells.

Specifically, the n first base stations perform configuration according to the at least one of the time domain information of the resource in the m cells, the frequency domain information of the resource in the m cells, the space domain information of the resource in the m cells, the code domain information of the resource in the m cells, the transmit power information of the resource in the m cells, and the information about the time at which resource configuration may be performed in the m cells.

In particular, the first base station may perform resource configuration or resource coordination according to the resource configuration information of the m cells, and then communicate with the UE.

S311. The control node sends at least one cell identifier in the identifiers of the m cells and stop instruction information to the n first base stations, where the stop instruction information is used to instruct the n first base stations to stop reporting measurement information of a cell.

After each of the n first base stations performs configuration according to the resource configuration information of the m cells, the control node sends the at least one cell identifier in the identifiers of the m cells and the stop instruction information to the n first base stations, where the stop instruction information is used to instruct the n first base stations to stop reporting the measurement information of the cell.

Specifically, after each of the n first base stations performs configuration according to the resource configuration information of the m cells, the control node sends a stop message to the n first base stations, where the stop message carries the at least one cell identifier in the identifiers of the m cells and the stop instruction information, and the stop instruction information is used to instruct the n first base stations to stop reporting the measurement information of the cell.

It should be noted that the at least one cell identifier is corresponding to at least one cell, and each of the at least one cell is any cell in the coordinated communication set.

S312. Each of the n first base stations stops, according to the at least one cell identifier and the stop instruction information, reporting measurement information of at least one cell corresponding to the at least one cell identifier, and sends a first reply confirmation message to the control node.

After the control node sends the at least one cell identifier in the identifiers of the m cells and the stop instruction information to the n first base stations, each of the n first base stations stops, according to the at least one cell identifier and the stop instruction information, reporting the measurement information of the at least one cell corresponding to the at least one cell identifier, and sends the first reply confirmation message to the control node.

It should be noted that each of the n first base stations stops, according to the at least one cell identifier and the stop instruction information, reporting the measurement information of the at least one cell corresponding to the at least one cell identifier; however, the n first base stations do not stop measuring the at least one cell.

S313. The control node stops, according to the first reply confirmation message, receiving the measurement information of the at least one cell.

After the n first base stations send the first reply confirmation message to the control node, the control node stops, according to the first reply confirmation message, receiving the measurement information of the at least one cell.

Figure 16A:
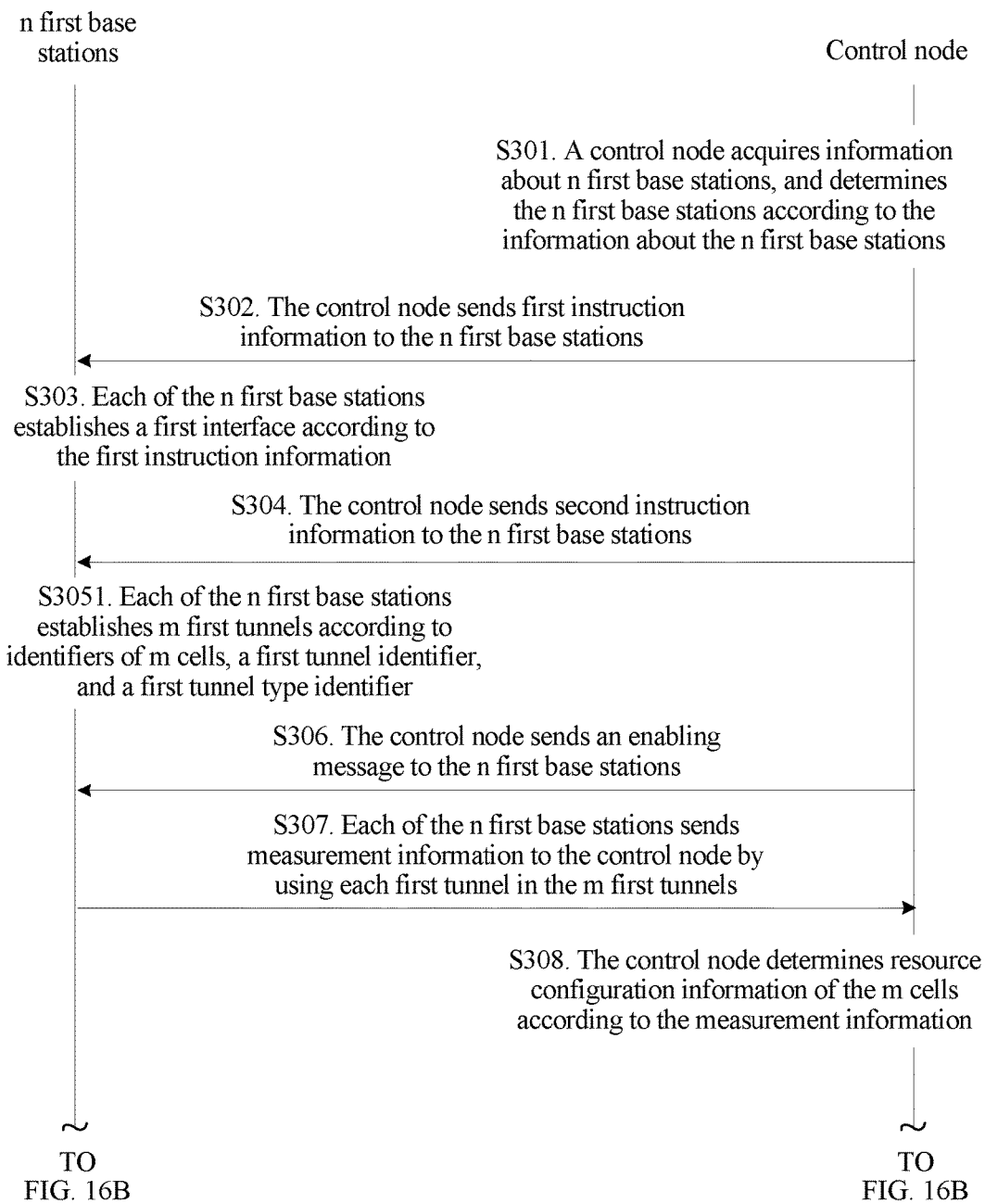
FIG. 16A and FIG. 16B each is an interaction diagram 2 of a coordinated communication method according to an embodiment of the present disclosure.
Figure 16B:
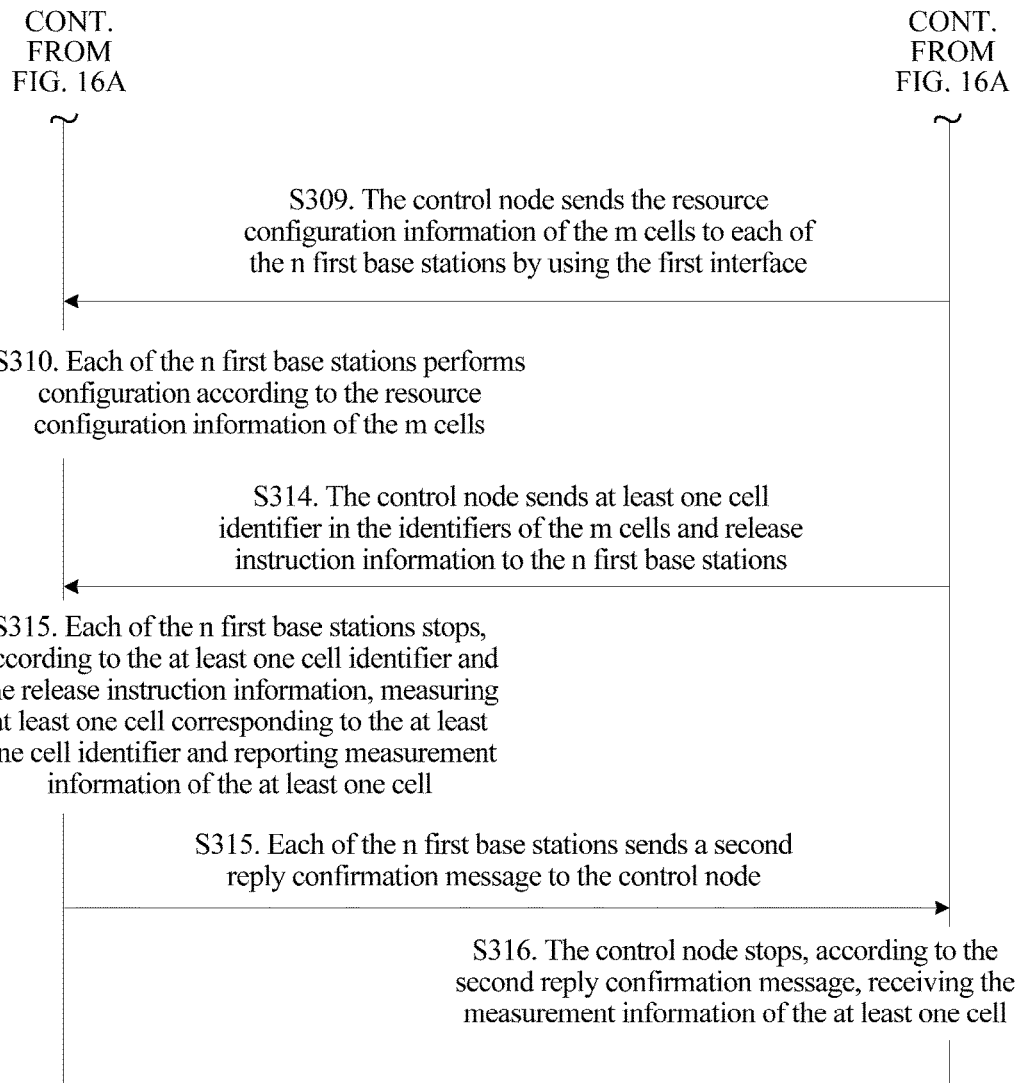

Further, in the coordinated communication method provided in this embodiment of the present disclosure, as shown in FIG. 16, after S310, the method further includes the following steps:

S314. The control node sends at least one cell identifier in the identifiers of the m cells and release instruction information to the n first base stations, where the release instruction information is used to instruct the n first base stations to stop measuring a cell and reporting measurement information of the cell.

After each of the n first base stations performs configuration according to the resource configuration information of the m cells, the control node sends the at least one cell identifier in the identifiers of the m cells and the release instruction information to the n first base stations, where the release instruction information is used to instruct the n first base stations to stop measuring the cell and reporting the measurement information of the cell.

Specifically, after each of the n first base stations performs configuration according to the resource configuration information of the m cells, the control node sends a release message to the n first base stations, where the release message carries the at least one cell identifier in the identifiers of the m cells and the release instruction information, and the release instruction information is used to instruct the n first base stations to stop measuring the cell and reporting the measurement information of the cell.

It should be noted that the at least one cell identifier is corresponding to at least one cell, and each of the at least one cell is any cell in the coordinated communication set.

S315. Each of the n first base stations stops, according to the at least one cell identifier and the release instruction information, measuring at least one cell corresponding to the at least one cell identifier and reporting measurement information of the at least one cell, and sends a second reply confirmation message to the control node.

After the control node sends the at least one cell identifier in the identifiers of the m cells and the release instruction information to the n first base stations, the n first base stations stop, according to the at least one cell identifier and the release instruction information, measuring the at least one cell corresponding to the at least one cell identifier and reporting the measurement information of the at least one cell, and send the second reply confirmation message to the control node.

It should be noted that according to the at least one cell identifier in the identifiers of the m cells and the release instruction information, the n first base stations not only stop reporting the measurement information corresponding to the at least one cell identifier, but also stop measuring the at least one cell.

S316. The control node stops, according to the second reply confirmation message, receiving the measurement information of the at least one cell.

After the n first base stations send the second reply confirmation message to the control node, the control node stops, according to the second reply confirmation message, receiving the measurement information corresponding to the at least one cell.

It should be noted that in this embodiment of the present disclosure, on one hand, S311 to S313 and S314 to S316 may be parallel steps after S310. In the present disclosure, S310 may be first performed, and then S311 to S313 may be performed, or S310 may be first performed, and then S311 to S316 may be performed. The present disclosure does not impose a limitation on a specific performing manner.

Figure 17A:
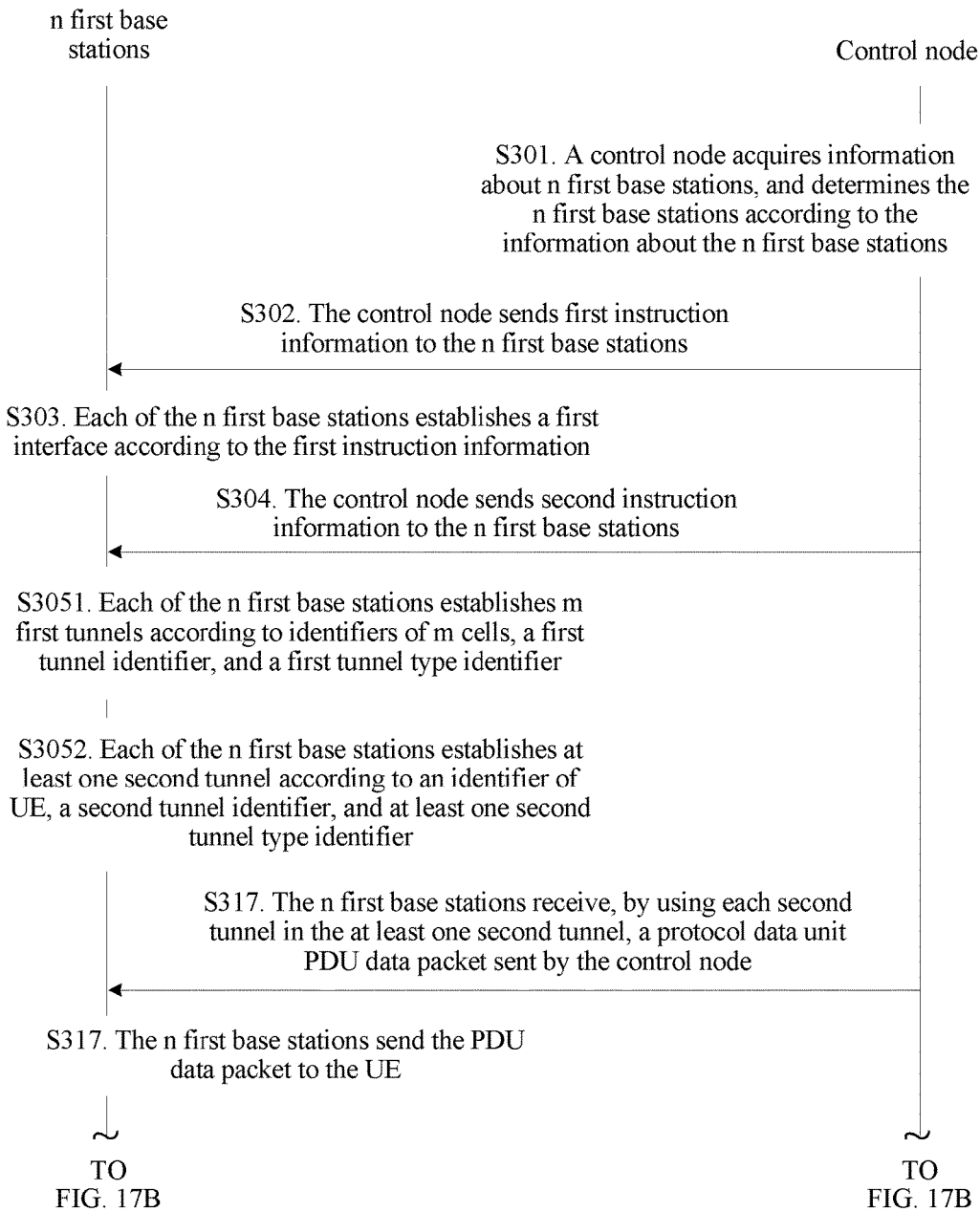
FIG. 17A and FIG. 17B each is an interaction diagram 3 of a coordinated communication method according to an embodiment of the present disclosure.
Figure 17B:
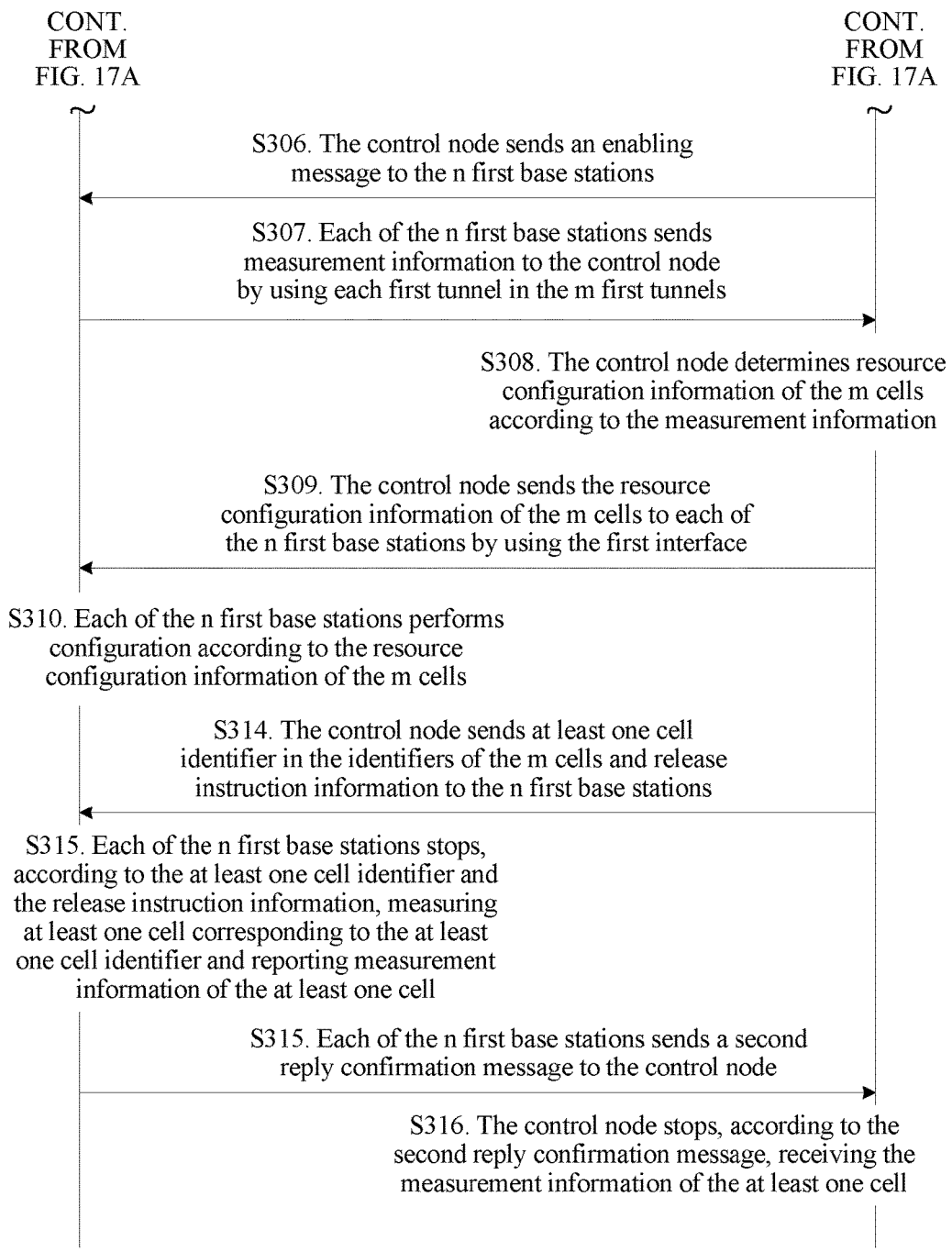

Further, as shown in FIG. 17, after S304, the method further includes S3052 and S317. Specifically, S3052 and S317 are as follows:

S3052. Each of the n first base stations establishes at least one second tunnel according to the identifier of the UE, the second tunnel identifier, and the at least one second tunnel type identifier.

After the control node sends the second instruction information to the n first base stations, each of the n first base stations establishes the at least one second tunnel according to the identifier of the UE, the second tunnel identifier corresponding to the identifier of the UE, and the at least one second tunnel type identifier corresponding to the identifier of the UE, so as to complete establishment of the second interface.

It should be noted that the first base station may establish one second tunnel according to one identifier of UE, one second tunnel identifier, and one second tunnel type identifier. In this embodiment of the present disclosure, because there may be three types of second tunnel type identifiers, one identifier of UE may be corresponding to establishment of three second tunnels, and types of data transmitted in the three second tunnels are respectively corresponding to the three second tunnels.

Further, each of the n first base stations may establish the at least one second tunnel according to the identifier of the UE, the second tunnel identifier corresponding to the identifier of the UE, the at least one second tunnel type identifier corresponding to the identifier of the UE, and the at least one bearer identifier corresponding to the UE.

It should be noted that a UE may have multiple services, and one service is corresponding to one bearer; therefore, one identifier of UE may be corresponding to multiple bearer identifiers. The first base station may establish one second tunnel according to one identifier of UE, one bearer identifier, one second tunnel identifier, and one second tunnel type identifier. In this embodiment of the present disclosure, there may be three types of second tunnel type identifiers; therefore, one bearer identifier may be corresponding to establishment of three second tunnels, and types of data transmitted in the three second tunnels are respectively corresponding to the three second tunnels.

It should be noted that in this embodiment of the present disclosure, S3051 and S3052 are two parallel steps after S304, and a sequence for performing S3051 and S3052 is not limited. Specifically, S304 and S3051 may be first performed, and then S3052 is performed, or S304 and S3052 may be first performed, and then S3051 is performed.

S317. The n first base stations receive, by using each second tunnel in the at least one second tunnel, a PDU data packet sent by the control node, and send the PDU data packet to the UE, where the PDU data packet is a data packet corresponding to the at least one second tunnel type identifier.

After each of the n first base stations establishes the at least one second tunnel according to the identifier of the UE, the second tunnel identifier, and the at least one second tunnel type identifier, the n first base stations receive, by using each second tunnel in the at least one second tunnel, the PDU data packet sent by the control node, and send the PDU data packet to the UE, where the PDU data packet is the data packet corresponding to the at least one second tunnel type identifier.

Specifically, the n first base stations receive, by using each second tunnel in the at least one second tunnel, the PDU data packet and at least one bearer identifier corresponding to the PDU data packet that are sent by the control node, and send the PDU data packet and the at least one bearer identifier corresponding to the PDU data packet to a first entity of the UE, where the first entity is a protocol layer entity corresponding to the PDU data packet.

It may be understood that on one hand, in this embodiment of the present disclosure, coordinated communication may be directly performed between first base stations at a protocol layer, which improves flexibility of communication between the base stations; on the other hand, when the control node is deployed in a first base station, and a PDU data packet may be transmitted between the control node and the first base station by using a second tunnel, the control node may communicate with the first base station and the UE at the same time, so that a throughput of the UE is improved.

It should be noted that S317 may be performed immediately after S3052, that is, S317 may be any step after S3052 is performed. FIG. 13 is one implementation manner according to this embodiment of the present disclosure.

Figure 18:
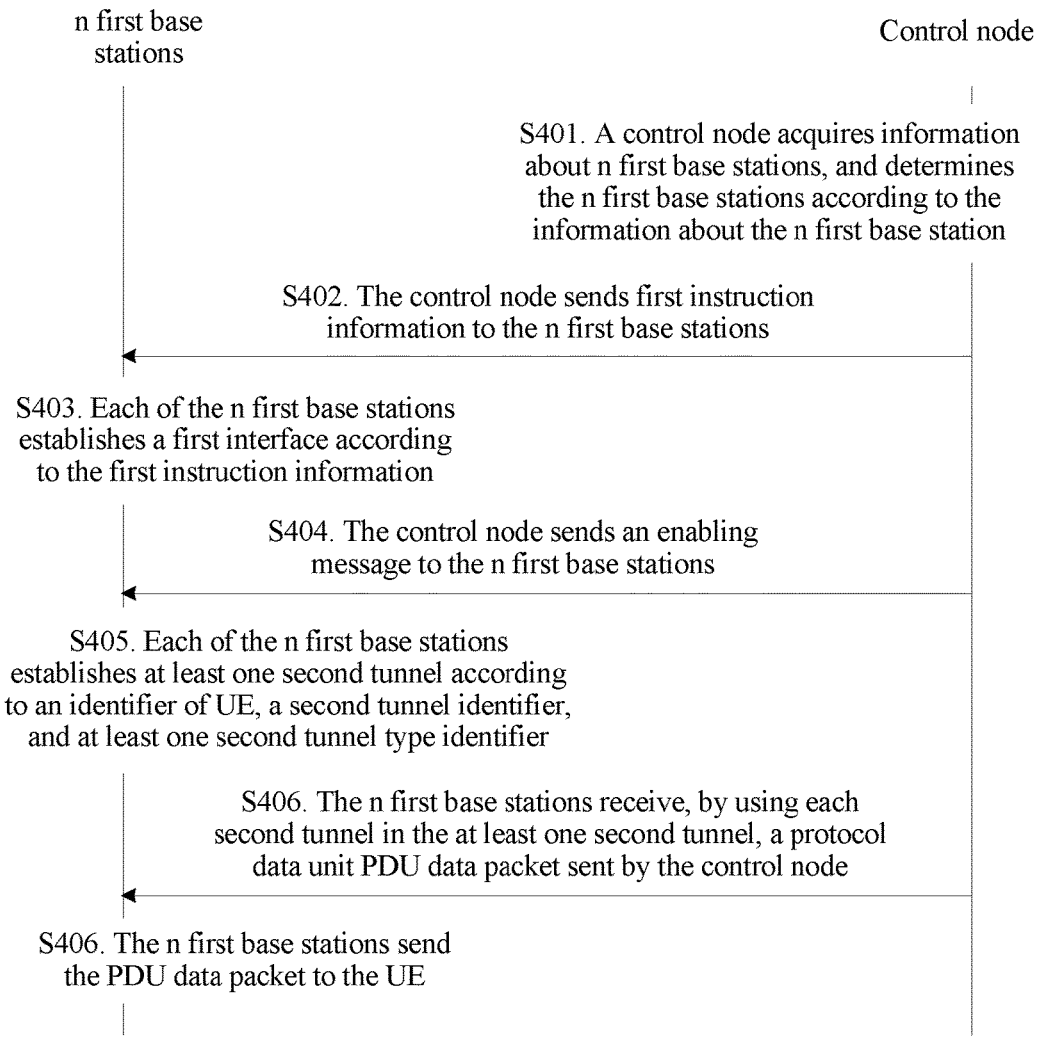
FIG. 18 is an interaction diagram 4 of a coordinated communication method according to an embodiment of the present disclosure.

This embodiment of the present disclosure further provides a coordinated communication method. As shown in FIG. 18, a difference between the coordinated communication method provided in this embodiment and the coordinated communication method provided in the foregoing embodiment lies in S305 to S319.

Specifically, the coordinated communication method provided in this embodiment may include the following steps:

S401. A control node acquires information about n first base stations, and determines the n first base stations according to the information about the n first base stations, where the n first base stations are base stations in a coordinated communication set.

For a specific process in which the control node acquires the information about the n first base stations, and determines the n first base stations according to the information about the n first base stations and a related description, reference may be made to step S301 and a description of S301 in this embodiment of the present disclosure, and details are not described herein again.

S402. The control node sends first instruction information to the n first base stations, where the first instruction information is used to instruct the n first base stations to establish a first interface.

For a specific process in which the control node sends the first instruction information to the n first base stations and a related description, reference may be made to step S302 and a description of S302 in this embodiment of the present disclosure, and details are not described herein again.

S403. Each of the n first base stations establishes the first interface according to the first instruction information.

For a specific process in which each of the n first base stations establishes the first interface according to the first instruction information and a related description, reference may be made to step S303 and a description of S303 in this embodiment of the present disclosure, and details are not described herein again.

S404. The control node sends second instruction information to the n first base stations, where the second instruction information is used to instruct the n first base stations to establish a second interface, and the second instruction information further includes an identifier of UE and at least one second tunnel identifier and at least one second tunnel type identifier that are corresponding to the identifier of the UE.

For a specific process in which the control node sends the second instruction information to the n first base stations and a related description, reference may be made to step S304 and a description of S304 in this embodiment of the present disclosure, and details are not described herein again.

It should be noted that what differs from S304 is that the second instruction information in this embodiment of the present disclosure needs to include only the identifier of the UE and the at least one second tunnel identifier and the at least one second tunnel type identifier that are corresponding to the identifier of the UE.

S405. Each of the n first base stations establishes at least one second tunnel according to the identifier of the UE, the second tunnel identifier, and the at least one second tunnel type identifier.

For a specific process in which each of the n first base stations establishes the at least one second tunnel according to the identifier of the UE, the second tunnel identifier, and the at least one second tunnel type identifier and a related description, reference may be made to step S3052 and a description of S3052 in this embodiment of the present disclosure, and details are not described herein again.

S406. The n first base stations receive, by using each second tunnel in the at least one second tunnel, a PDU data packet sent by the control node, and send the PDU data packet to the UE, where the PDU data packet is a data packet corresponding to the at least one second tunnel type identifier.

After each of the n first base stations establishes the at least one second tunnel according to the identifier of the UE, the second tunnel identifier, and the at least one second tunnel type identifier, the n first base stations receive, by using each second tunnel in the at least one second tunnel, the PDU data packet sent by the control node, and send the PDU data packet to the UE, where the PDU data packet is the data packet corresponding to the at least one second tunnel type identifier.

Specifically, the n first base stations receive, by using each second tunnel in the at least one second tunnel, the PDU data packet and at least one bearer identifier corresponding to the PDU data packet that are sent by the control node, and send the PDU data packet and the at least one bearer identifier corresponding to the PDU data packet to a first entity of the UE, where the first entity is a protocol layer entity corresponding to the PDU data packet.

It should be noted that an implementation manner of S401 to S406 in this embodiment is a coordinated communication manner based on the prior art.

It may be understood that on one hand, in this embodiment, coordinated communication may be directly performed between first base stations at a protocol layer, which improves flexibility of communication between the base stations; on the other hand, when the control node is deployed in a first base station, and a PDU data packet may be transmitted between the control node and the first base station by using a second tunnel, the control node may communicate with the first base station and the UE at the same time, so that a throughput of the UE is improved.

In the coordinated communication method provided in this embodiment of the present disclosure, a control node sends first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1; the control node receives, by using the second interface, measurement information reported by each of the n first base stations, where the measurement information is measurement results of m cells, and the m cells are served by any one of the n first base stations, and m≥1; the control node determines resource configuration information of the m cells according to the measurement information; and finally, the control node sends the resource configuration information of the m cells to each of the n first base stations by using the first interface, so that each of the n first base stations performs configuration according to the resource configuration information of the m cells. In the solution, the control node receives the measurement information by using the second interface, that is, a user plane interface, so that the measurement information is transmitted more quickly, and the control node sends the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

Embodiment 5

Figure 19:
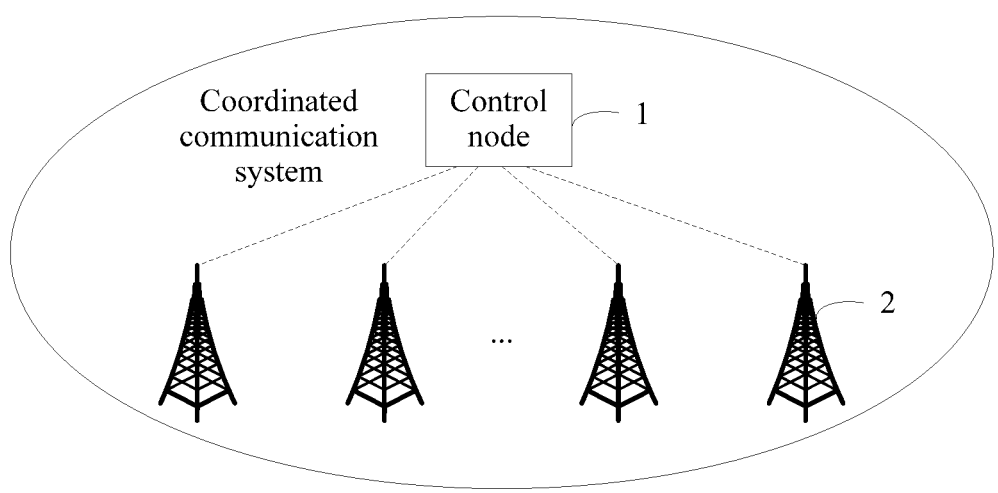
FIG. 19 is a block diagram of a coordinated communication system according to an embodiment of the present disclosure.

As shown in FIG. 19, this embodiment of the present disclosure provides a coordinated communication system, including:

the control node 1 described in Embodiment 1 or Embodiment 2 and the n first base stations 2 in Embodiment 1 or Embodiment 2 that communicate with the control node, where n≥1.

The coordinated communication system provided in this embodiment of the present disclosure is corresponding to a coordinated communication method on a control node side or a coordinated communication method on a base station side. The following uses the coordinated communication method on the control node side as an example for description.

Specifically, in the coordinated communication system, a control node sends first instruction information and second instruction information to each of n first base stations, so that each of the n first base stations establishes a first interface according to the first instruction information, and establishes a second interface according to the second instruction information, where the first instruction information is used to instruct the n first base stations to establish the first interface, the second instruction information is used to instruct the n first base stations to establish the second interface, the n first base stations are base stations in a coordinated communication set, and n≥1. The control node receives, by using the second interface, measurement information reported by each of the n first base stations, where the measurement information is measurement results of m cells, and the m cells are served by any one of the n first base stations, and m≥1. The control node determines resource configuration information of the m cells according to the measurement information. Finally, the control node sends the resource configuration information of the m cells to each of the n first base stations by using the first interface, so that each of the n first base stations performs configuration according to the resource configuration information of the m cells. In the solution, the control node receives the measurement information by using the second interface, that is, a user plane interface, so that the measurement information is transmitted more quickly, and the control node sends the resource configuration information of the m cells by using the first interface, that is, a control plane, so that the resource configuration information is transmitted more reliably and completely. Therefore, a transmission delay in inter-base-station coordinated communication can be reduced when reliability of the inter-base-station coordinated communication is ensured, and performance of the inter-base-station coordinated communication is improved.

It may be clearly understood by a person skilled in the art that, for the purpose of convenient and brief description, division of the foregoing function modules is taken as an example for illustration. In an actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in another manner. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM,), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control node controlling communication between base stations, comprising:
   a transmitter;
   a receiver; and
   a processor coupled with the transmitter and the receiver,
   wherein the transmitter is configured to send first instruction information and second instruction information to each of n communicating base stations among the base stations, the second instruction information including identifiers of the m cells and a first tunnel identifier and a first tunnel type identifier corresponding to the identifiers of the m cells,
   wherein the first instruction information is used to instruct each of the n communicating base stations to establish a first interface, the second instruction information is used to instruct each of the n communicating base stations to establish a second interface, the n communicating base stations are in a coordinated communication set of the base stations, and n ≥1,
   wherein the receiver is configured to receive, by using the second interface, measurement information reported by each of the n communicating base stations, wherein the measurement information is measurement results of m cells, and the m cells are served by any base station in the n communicating base stations, and m ≥1, and
   wherein the processor is configured to determine resource configuration information of the m cells according to the measurement information,
   wherein the transmitter is further configured to send, to each of the n communicating base stations by using the first interface, the resource configuration information of the m cells that is determined by the determining unit.

2. The control node according to claim 1, wherein the second instruction information further comprises an identifier of user equipment (UE) and a second tunnel identifier and at least one second tunnel type identifier that are corresponding to the identifier of the UE.

3. The control node according to claim 1, wherein: the transmitter is further configured to send an enabling message to the n communicating base stations, wherein the enabling message is used to enable the n communicating base stations to report the measurement information by using the second interface.

4. The control node according to claim 1, wherein the first instruction information is carried in a first request message, and the first request message further carries at least one of measurement parameter information, measurement feedback time information, UE quantity feedback information, or the identifiers of the m cells; and
   the transmitter is further configured to send the at least one of the measurement parameter information, the measurement feedback time information, the UE quantity feedback information, or the identifiers of the m cells to each of the n communicating base stations, wherein the measurement parameter information is used by each of the n communicating base stations to perform configuration on the first interface.

5. The control node according to claim 1, wherein
   the transmitter is further configured to send at least one cell identifier in the identifiers of the m cells and stop instruction information to the n communicating base stations, wherein the stop instruction information is used to instruct the n communicating base stations to stop reporting measurement information of a cell;

the receiver is further configured to receive a first reply confirmation message sent by each of the n communicating base stations; and the processor is further configured to stop, according to the first reply confirmation message, receiving the measurement information of the at least one cell.

6. The control node according to claim 1, wherein: an underlying bearer of the first interface is Stream Control Transmission Protocol (SCTP) and an underlying bearer of the second interface is User Datagram Protocol (UDP).

7. A first base station, comprising:

a receiver;

a processor; and a transmitter, wherein the receiver is configured to receive first instruction information and second instruction information that are sent by a control node, wherein the first instruction information is used to instruct to establish a first interface, and the second instruction information, including identifiers of the m cells and a first tunnel identifier and a first tunnel type identifier corresponding to the identifiers of the m cells, is used to instruct to establish a second interface, wherein the processor is configured to establish the first interface according to the first instruction information and establish the second interface according to the second instruction information;

wherein the transmitter is configured to send measurement information to the control node by using the second interface, wherein the measurement information is used by the control node determining resource configuration information of m cells, the measurement information is measurement results of the m cells, and the m cells are cells in a coordinated communication set, and m ≥1, wherein the receiver is further configured to receive, by using the first interface, the resource configuration information of the m cells that is sent by the control node, and wherein the processor is configured to perform configuration according to the resource configuration information of the m cells.

8. The first base station according to claim 7, wherein the processor is configured to establish m first tunnels according to the identifiers of the m cells, the first tunnel identifier, and the first tunnel type identifier.

9. The first base station according to claim 8, wherein the second instruction information further comprises an identifier of user equipment (UE) and a second tunnel identifier and at least one second tunnel type identifier that are corresponding to the identifier of the UE; and the processor is further configured to establish at least one second tunnel according to the identifier of the UE, the second tunnel identifier, and the at least one second tunnel type identifier.

10. The first base station according to claim 7, wherein the first instruction information is carried in a first request message, the first request message further carries at least one of measurement parameter information, measurement feedback time information, UE quantity feedback information, or the identifiers of the m cells, and the receiver is further configured to: receive the at least one of the measurement parameter information, the measurement feedback time information, the UE quantity feedback information, and the identifies of the m cells; and the processor is configured to perform, according to the at least one of the measurement parameter information, the measurement feedback time information, the UE quantity feedback information, or the identifiers of the m cells, configuration on the first interface.

11. The first base station according to claim 7, wherein the receiver is further configured to receive at least one cell identifier in the identifiers of the m cells and release instruction information that are sent by the control node, wherein the release instruction information is used to instruct to stop measuring a cell and reporting measurement information of the cell;

the processor is further configured to stop, according to the at least one cell identifier and the release instruction information, measuring at least one cell corresponding to the at least one cell identifier and reporting measurement information of the at least one cell; and the transmitter is further configured to send a second reply confirmation message to the control node, wherein the second reply confirmation message is used by the control node stopping receiving the measurement information of the at least one cell.

12. The first base station according to claim 7, wherein: an underlying bearer of the first interface is Stream Control Transmission Protocol (SCTP) and an underlying bearer of the second interface is User Datagram Protocol (UDP).

13. A coordinated communication method at a control node in a wireless communication system, comprising:

sending first instruction information and second instruction information to each of n communicating base stations, wherein the first instruction information is used to instruct each of the n communicating base stations to establish the first interface, the second instruction information, including identifiers of the m cells and a first tunnel identifier and a first tunnel type identifier corresponding to the identifiers of the m cells, is used to instruct each of the n communicating base stations to establish the second interface, the n communicating base stations are base stations in a coordinated communication set, and n ≥1;

receiving, by using the second interface, measurement information reported by each of the n communicating base stations, wherein the measurement information is measurement results of m cells, and the m cells are served by any base station in the n communicating base stations, and m ≥1;

determining resource configuration information of the m cells according to the measurement information; and sending the resource configuration information of the m cells to each of the n communicating base stations by using the first interface.

14. The coordinated communication method according to claim 13, wherein the second instruction information further comprises an identifier of user equipment (UE) and a second tunnel identifier and at least one second tunnel type identifier that are corresponding to the identifier of the UE.

15. The coordinated communication method according to claim 13, wherein the method further comprises: sending an enabling message to the n communicating base stations, wherein the enabling message is used to enable the n communicating base stations to report the measurement information by using the second interface.

16. The coordinated communication method according to claim 13, wherein the first instruction information is carried in a first request message, and the first request message further carries at least one of measurement parameter information, measurement feedback time information, UE quantity feedback information, or the identifiers of the m cells; and wherein the method further comprises: sending the at least one of the measurement parameter information, the measurement feedback time information, the UE quantity feedback information, or the identifiers of the m cells to each of the n communicating base stations.

17. The coordinated communication method according to claim 13, wherein an underlying bearer of the first interface is Stream Control Transmission Protocol (SCTP) and an underlying bearer of the second interface is User Datagram Protocol (UDP).

* * * * *